(12) United States Patent
Sugiyama et al.

(10) Patent No.: US 9,411,210 B2
(45) Date of Patent: Aug. 9, 2016

(54) IMAGE DISPLAY DEVICE

(71) Applicant: Panasonic Intellectual Property Management Co., Ltd., Osaka (JP)

(72) Inventors: Keiji Sugiyama, Kyoto (JP); Kenichi Kasazumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/403,237

(22) PCT Filed: Mar. 27, 2014

(86) PCT No.: PCT/JP2014/001789
§ 371 (c)(1),
(2) Date: Nov. 24, 2014

(87) PCT Pub. No.: WO2014/156167
PCT Pub. Date: Oct. 2, 2014

(65) Prior Publication Data
US 2015/0177591 A1    Jun. 25, 2015

(30) Foreign Application Priority Data
Mar. 28, 2013 (JP) ................................. 2013-070024

(51) Int. Cl.
G02B 26/08    (2006.01)
G02B 26/00    (2006.01)
(Continued)

(52) U.S. Cl.
CPC    *G02F 1/292* (2013.01); *G02B 5/18* (2013.01); *G02B 27/0093* (2013.01);
(Continued)

(58) Field of Classification Search
USPC ................................................ 359/295–300
See application file for complete search history.

(56) References Cited

U.S. PATENT DOCUMENTS

2007/0188837 A1    8/2007  Shimizu et al.
2010/0177025 A1*   7/2010  Nagata ................ G02B 6/0028
                                                     345/76
(Continued)

FOREIGN PATENT DOCUMENTS

| JP | 58-181004 | 10/1983 |
| JP | 2-241841 | 9/1990 |
| JP | 2007-11057 | 1/2007 |
| JP | 2007-219106 | 8/2007 |
| WO | 2012/046379 | 4/2012 |

OTHER PUBLICATIONS

International Search Report issued May 13, 2014 in International Application No. PCT/JP2014/001789.

*Primary Examiner* — Mohammed Hasan
(74) *Attorney, Agent, or Firm* — Wenderoth, Lind & Ponack, L.L.P.

(57) ABSTRACT

An image display device includes a light source which emits light, a display element which receives the light, from the light source for generating display light, a light guiding plate which causes the display light to propagate therein, an incident element which allows the display light from the display element to be incident into the light guiding plate, and a dynamic output diffraction element provided in the light guiding plate for outputting the display light to the outside of the light guiding plate. The dynamic output diffraction element includes dynamic diffraction segment elements configured such that a diffraction function of diffracting light is invalidated or validated by voltage application. The image display device further includes a control unit which controls the dynamic output diffraction element such that one dynamic diffraction segment element whose diffraction function is validated is selected each at a time from among the dynamic diffraction segment elements.

11 Claims, 29 Drawing Sheets

(51) Int. Cl.
*G02F 1/29* (2006.01)
*G02B 5/18* (2006.01)
*G02B 27/01* (2006.01)
*G02B 27/00* (2006.01)
*G06F 3/01* (2006.01)

(52) U.S. Cl.
CPC ....... *G02B 27/0101* (2013.01); *G02B 27/0103* (2013.01); *G06F 3/013* (2013.01); *G02B 2027/014* (2013.01); *G02B 2027/0118* (2013.01)

(56) References Cited

U.S. PATENT DOCUMENTS

| | | |
|---|---|---|
| 2011/0176218 A1 | 7/2011 | Noui |
| 2012/0242724 A1 | 9/2012 | Kurozuka et al. |
| 2013/0169704 A1* | 7/2013 | Tanaka ................ G09G 3/3406 345/691 |
| 2014/0160383 A1* | 6/2014 | Shikii .................... G02B 5/045 349/15 |
| 2015/0077850 A1* | 3/2015 | Kasano ................... G02F 1/29 359/463 |

* cited by examiner

2601

IMAGE DISPLAY DEVICE

TECHNICAL FIELD

The present invention relates to an image display device which is compact and yet capable of displaying a large screen by combination of a light guiding plate and a diffraction element.

BACKGROUND ART

A driver driving a vehicle such as an automobile is required to grasp the state of the outside of the vehicle, read information of a display device of the vehicle, and drive the vehicle safely and speedily during driving. In view of this it is desirable to provide a configuration such that information of a display device of a vehicle is readable in a range necessary for grasping the state of the outside of the vehicle during driving. For instance, it is expected to implement an image display device for displaying characters or images by causing light to irradiate onto a part of a transparent plate such as a front glass of a vehicle.

As examples of the transmissive image display device, there are known a head up display (hereinafter, called as "HUD") for displaying driving information on a front glass of an automobile, and a head mounted display (hereinafter, called as "HMD") for displaying information on a lens portion of eyeglasses. Use of the transmissive image display device allows for the driver to see the information (e.g. a map or a speed meter) relating to driving while visually recognizing the outside world. Thus, it is expected that the driver can more safely drive the vehicle.

As the conventional HUD, there is known an image display device for projecting a virtual image onto a front glass (see patent literature 1). FIG. 25 illustrates an example of a conventional HUD for projecting an image onto a front glass.

In the example of FIG. 25, a HUD housing 100 is accommodated in a dashboard of a car. A light source 101, an incident optical system 102, a display element 103, and a reflection mirror 104 are disposed in the HUD housing 100. The light source 101 is a light source such as a laser or an LED (Light Emitting Diode). The light source 101 illuminates the display element 103 through the incident optical system 102.

The display element 103 is a two-dimensional display element such as a liquid crystal panel or a DMD (Digital Mirror Device). The display element 103 receives light from the light source 101 for forming display light, and outputs the display light to the reflection mirror 104. The display light from the display element 103 is deflected on the reflection mirror 104, and is incident on a front glass 106 through an opening 105 formed in the HUD housing 100.

In a general HUD, it is often the case that the reflection mirror 104 employs an element having a function of optically enlarging an image such as a concave surface mirror in order to enlarge an image to be visually recognized by the driver. Display light 109 reflected on the front glass 106 is incident on the eyeball of a driver 108. Then, the driver 108 can visually recognize a virtual image 107 afar from the front glass 106.

In the specification, the area where the display light 109 reaches is called as an eye box 110. When the eyeball of the driver 108 lies in the eye box 110, the driver 108 can visually recognize the virtual image 107. Use of the above configuration allows for the driver 108 to visually recognize information necessary for driving, without the need of largely moving the line of sight even during driving.

However, in the HUD having the configuration as illustrated in FIG. 25, due to the large HUD housing 100, it may be difficult to secure a sufficient capacity in the inside of the dashboard. When the HUD housing 100 is large, it is difficult to load the HUD housing 100 in a compact car. Further, when the opening 105 is large, the external appearance of the dashboard may be impaired. It is desired to provide a HUD with a small housing and with a small opening. In order to satisfy the above demand, there is proposed an optical system including combination of a light guiding plate and a diffraction element (see e.g. patent literature 2 and patent literature 3).

FIG. 26 illustrates a conventional example of a HUD provided with an optical system including combination of a light guiding plate and a diffraction element. In the example of FIG. 26, a HUD housing 200 is accommodated in a dashboard. A light source 201, an incident optical system 202, a display element 203, an incident diffraction element 204, and a part of a light guiding plate 205 are accommodated in the HUD housing 200. The light source 201, the incident optical system 202, and the display element 203 are substantially the same as those in FIG. 25 and accordingly, description thereof is omitted.

Display light 207 from the display element 203 is incident on the incident diffraction element 204 provided in the light guiding plate 205. The light guiding plate 205 guides the display light 207 by total reflection therein. Further, the light guiding plate 205 is made of a material capable of transmitting light from the outside world, for instance, is made of a transparent material such as glass or acrylic resin in order to prevent obstruction of the view of a driver 210.

The incident diffraction element 204 has a function of changing the angle of incident light so that the incident display light 207 causes total reflection in the light guiding plate 205. As an example of the incident diffraction element 204, it is possible to use a diffraction element such as a volume hologram or a relief hologram. The display light 207 is incident on an output diffraction element 206 provided in the light guiding plate 205, while repeating total reflection in the light guiding plate 205.

The output diffraction element 206 acts on light incident at a specific incident angle. In the example of FIG. 26, the display light 207 is incident on portions indicated by the broken lines 211a, 211b, and 211c at an angle at which light is diffracted on the output diffraction element 206. Accordingly, the display light 207 is diffracted at the portions indicated by the broken lines 211a, 211b, and 211c, and diffraction light 208 is generated.

Further, the output diffraction element 206 defines the travelling direction of the diffraction light 208 so that the diffraction light 208 is output from the light guiding plate 205. In this example, the output diffraction element 206 is designed so that the angle of reflection of the diffraction light 208 on the light guiding plate 205 is not larger than the total reflection angle on the light guiding plate 205. The above operation allows for the display light 207 subjected to total reflection in the light guiding plate 205 to be output from the light guiding plate 205 as output light.

In FIG. 26, the output diffraction element 206 is designed to diffract a part of incident light and to transmit a part of the incident light. Accordingly, a part of light causes total reflection in the light guiding plate 205, and is diffracted at a position (the portions indicated by the broken lines 211b and 211c in FIG. 26) where the light satisfies the diffraction condition of the output diffraction element 206, even after the display light 207 is diffracted on the portion indicated by the broken line 211a in FIG. 26.

As described above, adjusting the diffraction efficiency of the output diffraction element 206, and generating diffraction light at a plurality of positions on the output diffraction element 206 makes it possible to increase an area where the driver 210 can visually recognize the diffraction light 208. The above configuration is advantageous in increasing an eye box 212 (an area where the driver 210 can visually recognize a display image).

As described above, allowing the diffraction light 208 to be incident on the eyeball of the driver 210 allows for the driver 210 to visually recognize a virtual image 209 afar from the light guiding plate 205.

In the example illustrated in FIG. 26, use of an optical system including combination of the light guiding plate 205 and the output diffraction element 206 makes it possible to reduce the capacity for a reflection mirror or the like necessary in the example illustrated in FIG. 25, thereby reducing the capacity of the housing 200. Further, it is only necessary to secure the thickness of the light guiding plate 205 as the size of the opening necessary for the dashboard. Thus, it is not necessary to form a large hole in the dashboard. This makes it possible to provide a HUD with less design impairment on a car.

However, in the conventional HUD as described above, there is no measures against an influence of diffraction of unwanted light (e.g. external light).

CITATION LIST

Patent Literature

Patent literature 1: Japanese Unexamined Patent Publication No. Sho 58-181004
Patent literature 2: Japanese Unexamined Patent Publication No. Hei 2-241841
Patent literature 3: Specification of U.S. Patent Application Publication No. 2011/0176218

SUMMARY OF INVENTION

In view of the above, an object of the invention is to provide an image display device that enables to prevent stray light resulting from external light to thereby enhance the visibility of the user, and to miniaturize an optical system.

An image display device according to an aspect of the invention is provided with a light source which emits light, a display element which receives the light from the light source for generating display light, a light guiding plate which causes the display light to propagate therein, an incident element which allows the display light from the display element to be incident into the light guiding plate, and a dynamic output diffraction element provided in the light guiding plate for outputting the display light to the outside of the light guiding plate. The dynamic output diffraction element includes dynamic diffraction segment elements configured such that a diffraction function of diffracting light is invalidated or validated by voltage application. The image display device is further provided with a control unit which controls the dynamic output diffraction element such that one dynamic diffraction segment element whose diffraction function is validated is selected each at a time from among the dynamic diffraction segment elements.

According to the image display device of the invention, it is possible to prevent stray light resulting from external light to thereby enhance the visibility of the user, and to miniaturize an optical system.

DESCRIPTION OF EMBODIMENTS

Findings Based on which the Invention has been Made

As described above, stray light resulting from external light may be generated when a diffraction element is used in an optical system of a HUD. External light indicates light which may be incident into a car from a light source on the outside of the car, such as the sun, a streetlamp, or a tail lamp of a vehicle in front of the car. The diffraction element may diffract such unwanted light (e.g. external light) when the light satisfies a diffraction condition.

Figure 27:
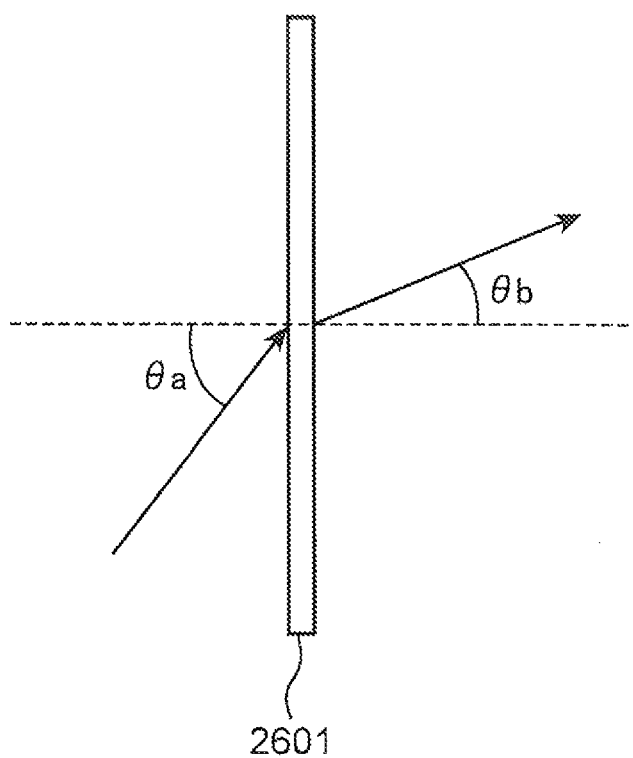
FIG. 27 is a schematic diagram for describing a diffraction condition in a diffraction element.

Generally, a diffraction element diffracts light that satisfies a diffraction condition (a condition relating to the incident angle and the wavelength of light to be diffracted on the element). This example is illustrated referring to FIG. 27. A diffraction element 2601 in FIG. 27 is designed to diffract light incident at an incident angle θa, and to diffract the light at an output angle θb. However, generally, in a diffraction element such as a volume hologram, the diffraction element also diffracts light whose incident angle is θb. This example is illustrated in FIG. 28.

Figure 28:
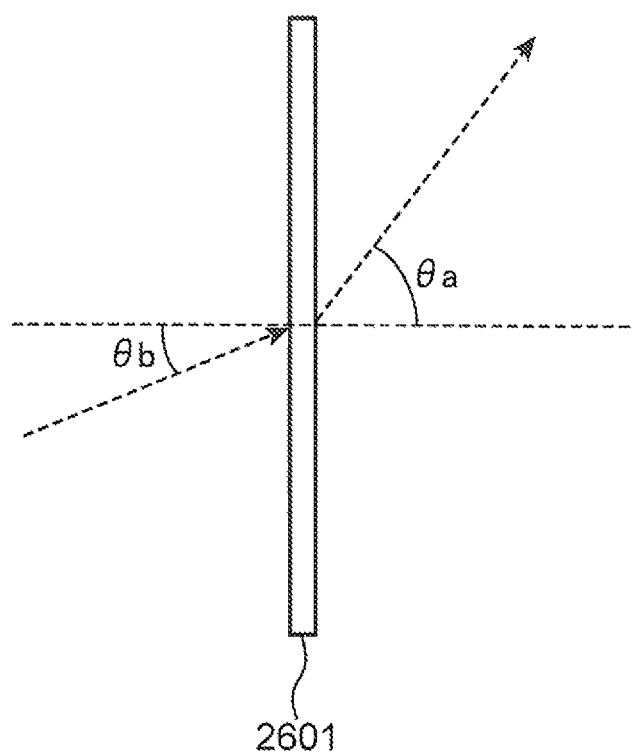
FIG. 28 is a schematic diagram for describing another diffraction condition in a diffraction element.

In the example of FIG. 28, the diffraction element 2601 outputs light incident at an incident angle θb, at an output angle θa. In this way, the diffraction element 2601 diffracts light that satisfies a specific diffraction condition (such as a Bragg condition). Therefore, the diffraction element 2601 diffracts not only the display light 207 illustrated in the example of FIG. 26 but also unwanted light (e.g. external light) when the diffraction condition is satisfied. The influence of diffraction of unwanted light is described referring to FIG. 29.

Figure 26:
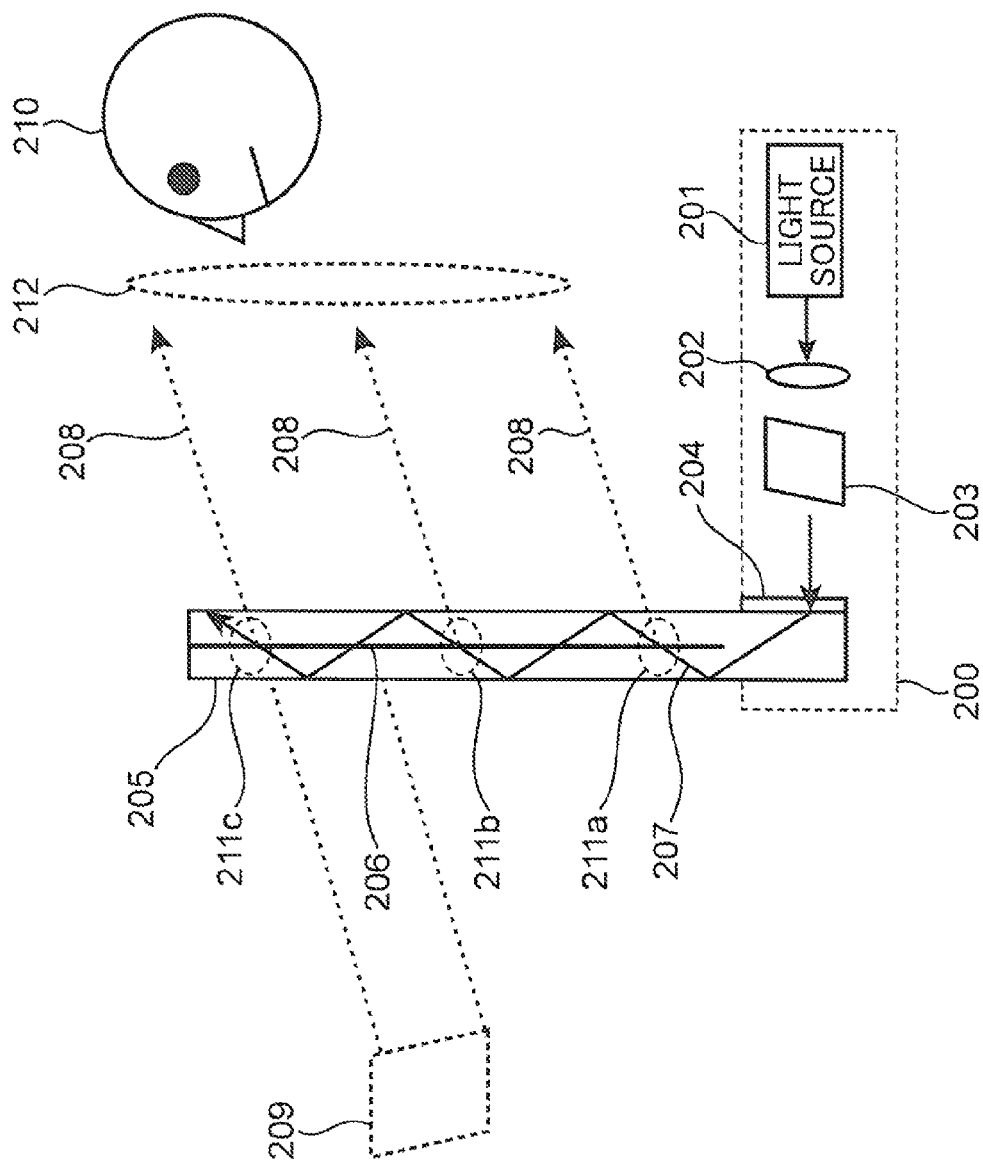
FIG. 26 is a diagram illustrating a configuration example of a conventional HUD using a light guiding plate and a diffraction element.
Figure 29:
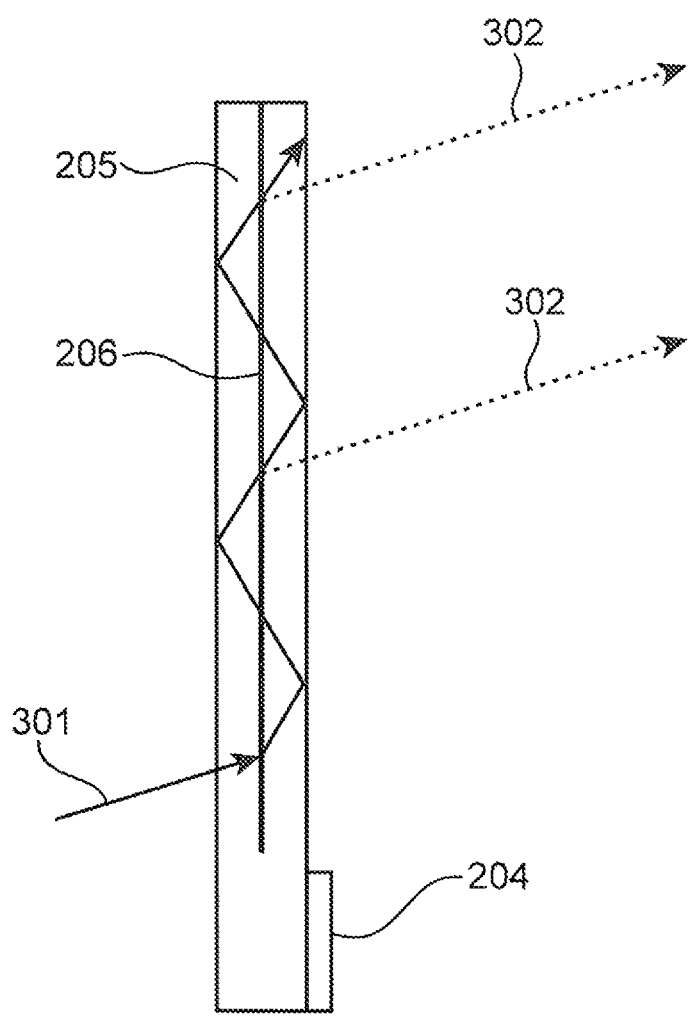
FIG. 29 is a schematic diagram for describing occurrence of stray light in an optical system employing a light guiding plate and a diffraction element.

FIG. 29 illustrates an example when external light 301 is incident on the light guiding plate 205. In this example, the incident angle of the external light 301 on the output diffraction element 206 in the light guiding plate 205 coincides with the angle (θb in FIG. 27 and FIG. 28) at which the display light 207 in FIG. 26 is output from the output diffraction element 206. Accordingly, the external light 301 is diffracted on the output diffraction element 206. At the time of diffraction, the angle of diffraction of the external light 301 coincides with the angle (θa in FIG. 27 and FIG. 28) at which the display light 207 in FIG. 26 is incident on the output diffraction element 206.

As illustrated in FIG. 26, the angle of incidence of the display light 207 on the output diffraction element 206 satisfies the condition in which the display light 207 causes total reflection in the light guiding plate 205. Therefore, the external light 301 diffracted on the output diffraction element 206 is totally reflected in the light guiding plate 205, and then is incident on the output diffraction element 206 at the incident angle θa.

At the time of incidence, the external light 301 is diffracted at the same diffraction angle θb as the display light 207. The light output at the diffraction angle θb is output to the outside of the light guiding plate 205, without causing total reflection in the light guiding plate 205. As a result, light 302 as diffraction light of the external light 301 is output to the outside of the light guiding plate 205, and impinges on the eyeball of the driver. This causes the driver to visually recognize the light as stray light. Generally, stray light resulting from external light of a strong intensity such as the sunlight or streetlight annoys the drivers. Accordingly, there is a demand for preventing such stray light.

In the following, embodiments of the invention are described referring to the drawings.

The followings embodiments are examples of the invention. The numerical values, the shapes, the constituent elements, etc. in the following embodiments are examples, and do not limit the invention. Further, the constituent elements that are not described in the independent claim that defines the broadest scope are described as optional constituent elements. Further, it is possible to combine the contents of the respective embodiments in all the embodiments, as necessary.

First Embodiment

Figure 1:
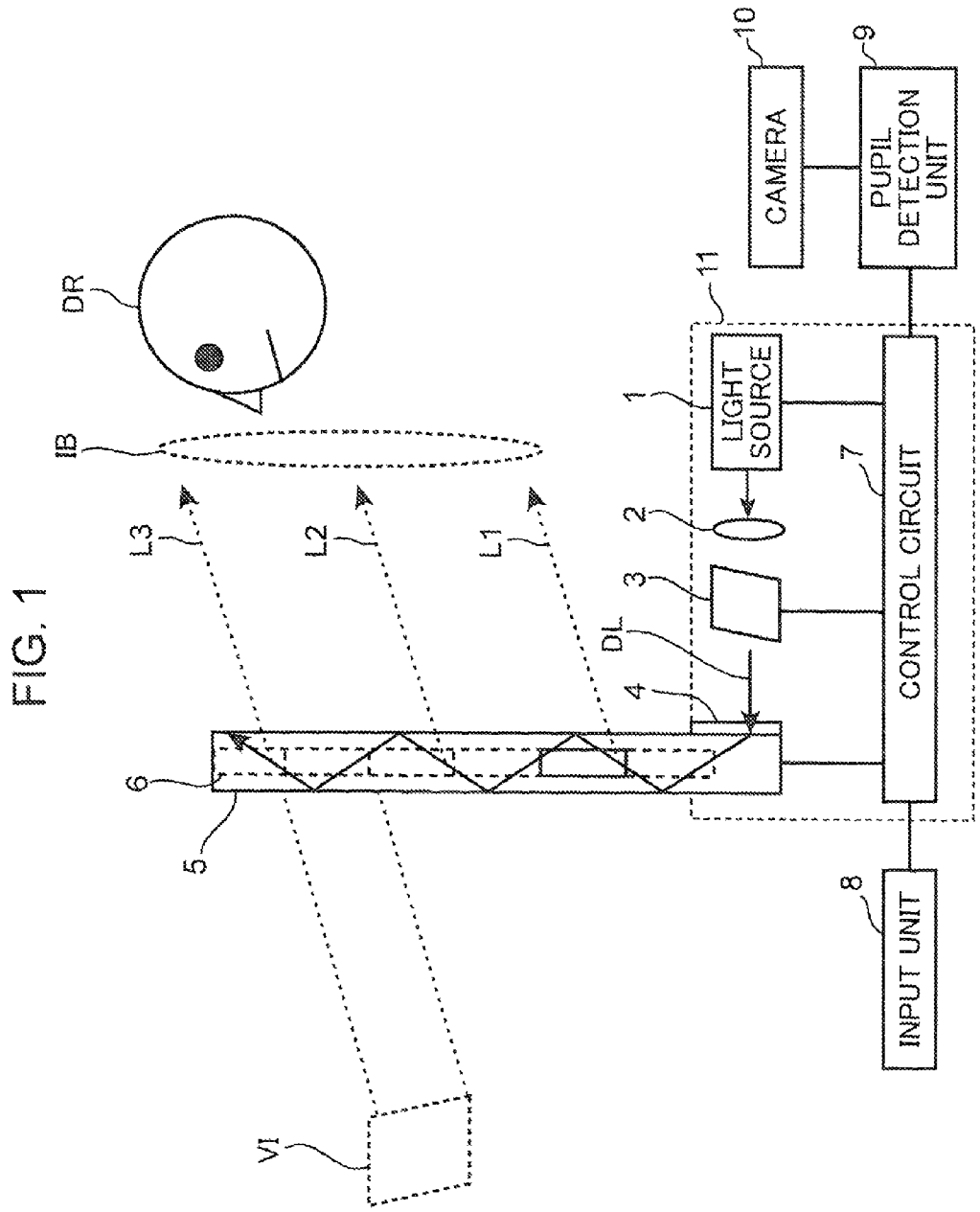
FIG. 1 is a schematic diagram illustrating a configuration of a HUD according to the first embodiment of the invention.

In the embodiment, there is described a method for suppressing stray light in an optical system of a HUD. FIG. 1 is a schematic diagram illustrating a configuration of a HUD (Head Up Display) according to the first embodiment of the invention. The HUD illustrated in FIG. 1 is a head up display loaded in e.g. an automobile and configured to display driving information to the driver DR. The HUD is provided with a light source 1, an incident optical system 2, a display element 3, an incident diffraction element 4, a light guiding plate 5, a dynamic output diffraction element 6, a control circuit 7, an input unit 8, a pupil detection unit 9, a camera 10, and a HUD housing 11. The control circuit 7 controls the operations of the light source 1, the display element 3, and the dynamic output diffraction element 6.

The HUD housing 11 is accommodated in the dashboard of a car. The light source 1, the incident optical system 2, the display element 3, the incident diffraction element 4, a part of the light guiding plate 5, and the control circuit 7 are accommodated in the HUD housing 11. In FIG. 1, the input unit 8, the pupil detection unit 9, and the camera 10 are illustrated to be disposed on the outside of the HUD housing 11. The embodiment is not specifically limited to the above example. The pupil detection unit 9 and the like may be disposed in the HUD housing 11.

The light source 1 is e.g. an LED light source, and is configured to output light for illuminating the display element 3. The LED light source may be a single color light source, or may be constituted of three light sources for outputting light of three colors of R, G, and B. Further, it is possible to use a method for outputting light of three colors of R, G, and B all at once in accordance with the method for driving the display element 3. Alternatively, it is possible to configure such that light of three colors of R, G, and B is output sequentially.

Further, a laser light source for outputting laser light may be used as the light source 1. Use of a laser light source makes it possible to reduce the wavelength region of light. Therefore, the above configuration makes it possible to reduce the wavelength region within which the dynamic output diffraction element 6 is required to diffract light. Thus, the above configuration is advantageous in increasing the transmittance of external light, and in implementing a HUD of good visibility.

Further, a semiconductor laser (a laser diode), or a laser other than the semiconductor laser may be used as the laser light source. Use of a semiconductor laser is advantageous in suppressing the cost of the light source. Further, the laser light source may be a combination of a semiconductor laser and a light source other than the semiconductor laser, or a combination of an infrared semiconductor laser and an SHG (second harmonic generation) element for converting infrared light into green light. The above configuration is advantageous in reducing the wavelength region of the light source.

The light source 1 illuminates the display element 103 through the incident optical system 2. The incident optical system 2 is constituted of various optical components. For instance, disposing the incident optical system 2 composed of a collimator lens at a position posterior to the light source 1 makes it possible to efficiently allow incidence of the light from the light source 1 on the display element 3. The incident optical system 2 may be disposed or may be omitted, as necessary.

The display element 3 is configured to receive light from the light source 1 for generating display light DL, and to form a display image to the driver DR as a user. It is not necessary to limit the display element 3 to a display element of a specific type. However, in the embodiment, a liquid crystal element is used as the display element 3. The display element 3 is a transmissive element for transmitting light from the light source 1. Alternatively, the display element 3 may be a reflective element. For instance, it is possible to use a reflective liquid crystal (such as an LCOS: Liquid Crystal On Silicon) or a mirror display element (such as a DMD). Use of a reflective element is advantageous in enhancing the light use efficiency, and in suppressing electric power consumption of the light source 1. Further, the above configuration is advantageous in displaying an image with a high luminance.

Further, the display element 3 may perform field sequential display of sequentially displaying pixels of R, G, and B. According to the above configuration, it is not necessary to provide a color filter in the display element 3. This is advantageous in enhancing the light use efficiency. Further, it is not necessary to align pixels of R, G, and B. This is advantageous in miniaturizing the display element 3.

Further, the display element 3 may be constituted of a scanning MEMS (Micro Electro Mechanical Systems) mirror. The MEMS mirror is configured to form a display image by two dimensionally scanning light from a light source. This is advantageous in miniaturizing the display element 3. Further, it is possible to provide an intermediate screen for forming an image to be formed by the MEMS mirror. According to the above configuration, providing the intermediate screen with characteristics of controlling the diffusion angle of light is advantageous in enhancing the light use efficiency of the light source 1, and in displaying an image with a high luminance.

Further, the display element 3 may be provided with a lens system. For instance, providing a collimator lens for collimating light from the display element 3 is advantageous in efficiently reflecting light within the light guiding plate 5. Further, it is possible to provide a lens system for enlarging a display image on the display element 3. The above configuration is advantageous in enlarging a virtual image VI to be visually recognized by the driver DR.

In the embodiment, the display element 3 is provided with a collimator lens. The display light DL from the display element 3 is incident on the incident diffraction element 4 provided in the light guiding plate 5 as collimated light (parallel light).

The incident diffraction element 4 is configured to change the travelling direction of the incident display light DL for causing the display light DL to be incident further into the light guiding plate 5. In the HUD employing the light guiding plate 5, the diffraction performance of the incident diffraction element 4 is configured in such a manner that the display light DL causes total reflection within the light guiding plate 5. In the embodiment, the display light DL is incident on the incident diffraction element 4 vertically (at an incident angle 0). Further, the display light DL is output from the incident diffraction element 4 at an angle larger than the total reflection angle (the critical angle) of the light guiding plate 5. As far as the incident diffraction element 4 is capable of totally reflecting the display light DL within the light guiding plate 5, any other incident element may be used.

In the embodiment, the incident diffraction element 4 uses a volume hologram. The volume hologram has a high diffraction efficiency, and is capable of suppressing generation of high-order diffraction light. Accordingly, it is possible to display an image with a high luminance and with less noise. Further, the incident diffraction element 4 is configured to diffract light of the same wavelength as the wavelength of the light source 1. Further, in the embodiment, when the light source 1 has a plurality of wavelengths (e.g. three wavelengths of R, G, and B), a method (a multiple exposure method) for recording interference fringes with respect to the wavelengths is applied to the volume hologram.

When a multiple exposure method is not applied to the volume hologram, it is possible to use a method for laminating three layers of incident diffraction elements for the respective wavelengths of R, G, and B. According to the above configuration, reducing the wavelength at which light is diffracted on each of the incident diffraction elements makes it possible to suppress crosstalk. In the specification, crosstalk indicates a phenomenon such that a diffraction element configured for a certain wavelength diffracts light of another wavelength. For instance, if a diffraction element configured to diffract light in a green wavelength region diffracts red light, color blur or image blur may appear on a display image.

Further, a dynamic diffraction element capable of electrically turning on or off the diffraction function may be used as the incident diffraction element 4 for suppressing crosstalk as described above. The dynamic diffraction element is an element configured to record interference fringes in the liquid crystal, and to validate or invalidate the function of the recorded interference fringes by applying a voltage to the element. For instance, it is possible to use an element such as DigiLens (a registered trademark: a product by SBS Labs Inc., US). According to the above configuration, the light source 1 sequentially turns on light of R, G, and B, and validates the diffraction function of a dynamic diffraction element for each wavelength in accordance with a timing of turning on the light source 1. This configuration makes it possible to allow incidence of light into the light guiding plate 5 without generating crosstalk.

Further, an element other than a volume hologram may be used as the incident diffraction element 4. For instance, a relief hologram element may be used. The above configuration makes it easy to manufacture the element.

Further, in the embodiment, a transmissive diffraction element is used as the incident diffraction element 4. Alternatively, a reflective diffraction element may be used. The above configuration makes it possible to enhance the diffraction efficiency. This is advantageous in displaying an image with a high luminance. In the embodiment, the incident diffraction element 4 is disposed on the outside of the light guiding plate 5. Alternatively, it is possible to configure such that the incident diffraction element 4 is disposed in the light guiding plate 5.

The light guiding plate 5 causes the incident display light DL to propagate therein via the incident diffraction element 4. The light guiding plate 5 is made of a material capable of transmitting light from the outside world in order to avoid obstruction of the view of the driver DR. For instance, the light guiding plate 5 is made of a transparent material such as glass or acrylic resin.

Figure 2:
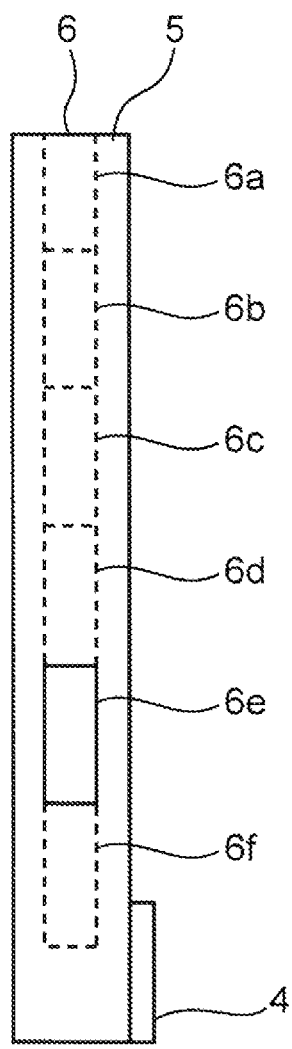
FIG. 2 is a diagram illustrating a configuration example of a light guiding plate illustrated in FIG. 1.

Light incident on the light guiding plate 5 is incident on the dynamic output diffraction element 6, while causing total reflection within the light guiding plate 5. FIG. 2 illustrates the light guiding plate 5 provided with the dynamic output diffraction element 6 in the embodiment. The dynamic output diffraction element 6 is provided in the light guiding plate 5, and is constituted of dynamic diffraction segment elements 6a to 6f. In the embodiment, the number of dynamic diffraction segment elements is six. This is merely an example. The number of dynamic diffraction segment elements may be the number other than the above.

The dynamic diffraction segment elements 6a to 6f are the aforementioned dynamic diffraction element, and are configured to validate or invalidate the diffraction function of the element by controlling the voltage to be applied to the element by the control circuit 7. In the embodiment, it is configured such that the diffraction function of the dynamic diffraction segment elements 6a to 6f is sequentially validated.

In the example illustrated in FIG. 2, only the diffraction function of the dynamic diffraction segment element 6e indicated by the solid line is validated, and the diffraction function of the dynamic diffraction segment elements 6a to 6d, and 6f indicated by the broken line is invalidated. Upon lapse of a predetermined time, the diffraction function of the dynamic diffraction segment element 6e is invalidated, and subsequently, the diffraction function of the dynamic diffraction segment element 6d is validated. In other words, the control circuit 7 controls the dynamic output diffraction element 6 in such a manner that one element having a diffraction function at a certain point of time is selected from among the dynamic diffraction segment elements 6a to 6f.

It is not necessary to specifically limit the timing of switching the dynamic diffraction segment element whose diffraction function is to be validated. For instance, let it be assumed that the time for displaying one frame of an image by the display element 3 is t seconds, and the total number of dynamic diffraction segment elements is N, it is possible to set the time X for validating the diffraction function of one dynamic diffraction segment element to be not longer than (t/N) seconds. According to the above configuration, the driver can visually recognize an image to be displayed by the display element 3 without skipping a frame of an image, even if diffraction light from any dynamic diffraction segment element impinges on the driver's eyes.

Figure 3:
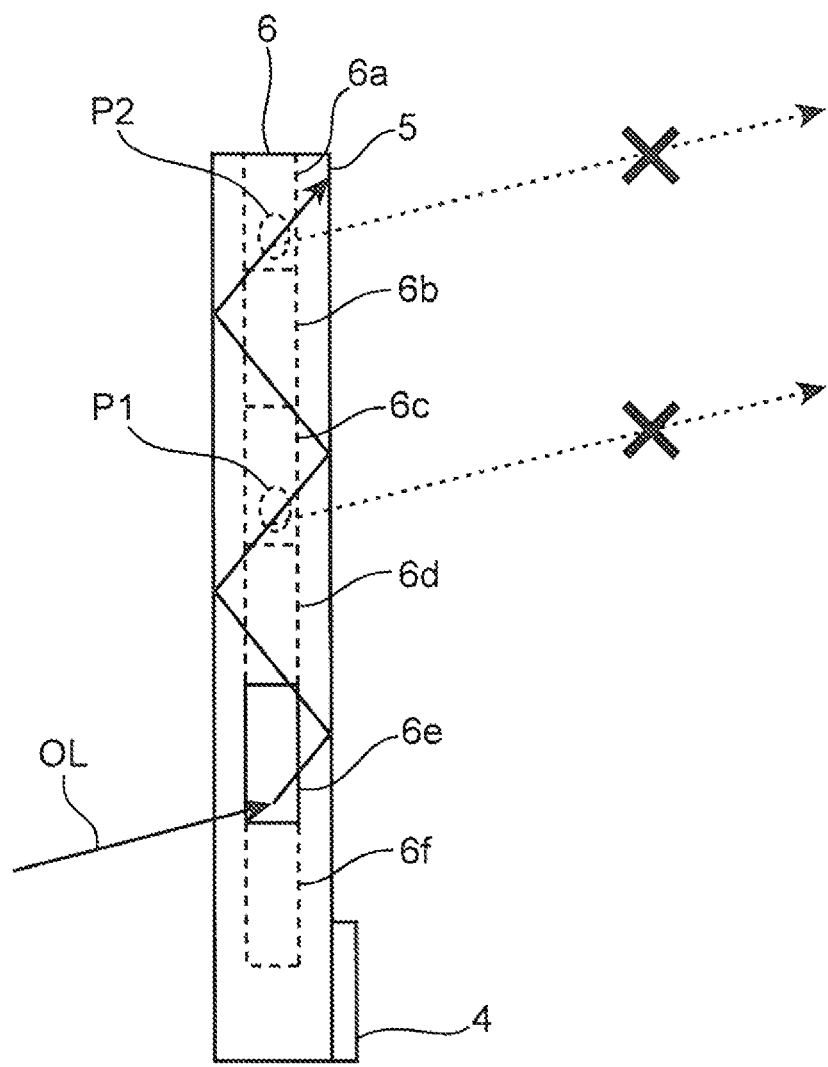
FIG. 3 is a schematic diagram for describing prevention of stray light in the first embodiment of the invention.

Description is made as to how stray light resulting from external light is suppressed by controlling the dynamic diffraction segment elements 6a to 6f, referring to FIG. 3. In FIG. 3, only the diffraction function of the dynamic diffraction segment element 6e is validated among the dynamic diffraction segment elements, and the diffraction function of the dynamic diffraction segment elements 6a to 6d, and 6f is invalidated.

Accordingly, external light OL is diffracted only on the dynamic diffraction segment element 6e, and causes total reflection within the light guiding plate 5. In the conventional art, the diffraction function of the dynamic diffraction segment elements 6c and 6a is invalidated at the portions P1 and P2, at which light is diffracted again. Accordingly, diffraction light (light indicated by the broken lines in FIG. 3) to the outside of the light guiding plate 5 is not generated.

Figure 4:
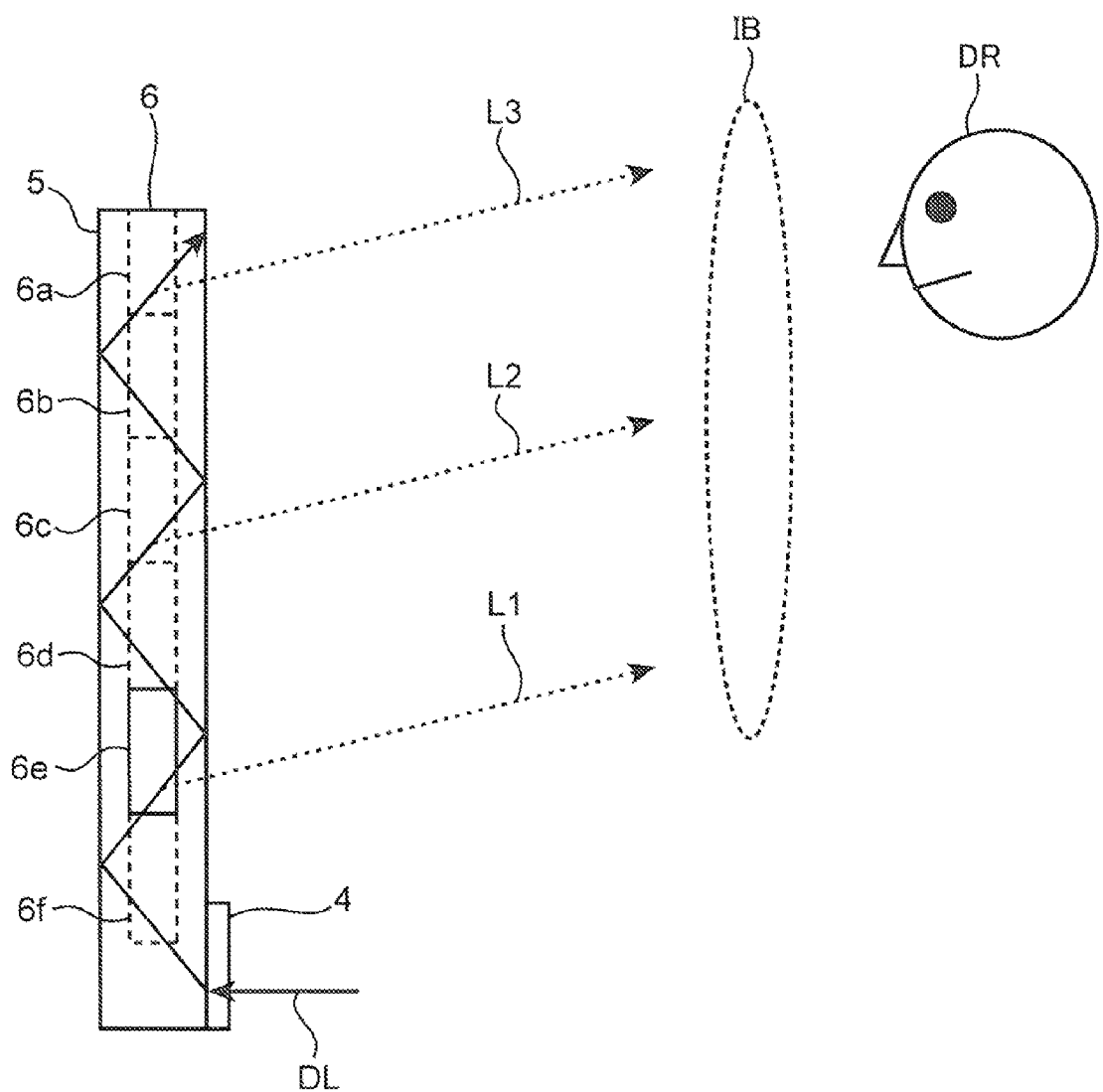
FIG. 4 is a schematic diagram for describing diffraction of display light in the first embodiment of the invention.

On the other hand, FIG. 4 illustrates an example of diffraction of the display light DL. In FIG. 4, the display light DL is diffracted on the dynamic diffraction segment element 6e whose diffraction function is validated, and is output from the light guiding plate 5. The driver DR can visually recognize a virtual image by output diffraction light L1. Further, sequentially validating the diffraction function of the dynamic diffraction segment elements 6c and 6a makes it possible to extract display light such as diffraction light L2 and L3 (light that has been extracted by the conventional output diffraction element 206 in FIG. 2) from the light guiding plate 5. This is advantageous in maintaining a wide eye box IB.

Figure 5:
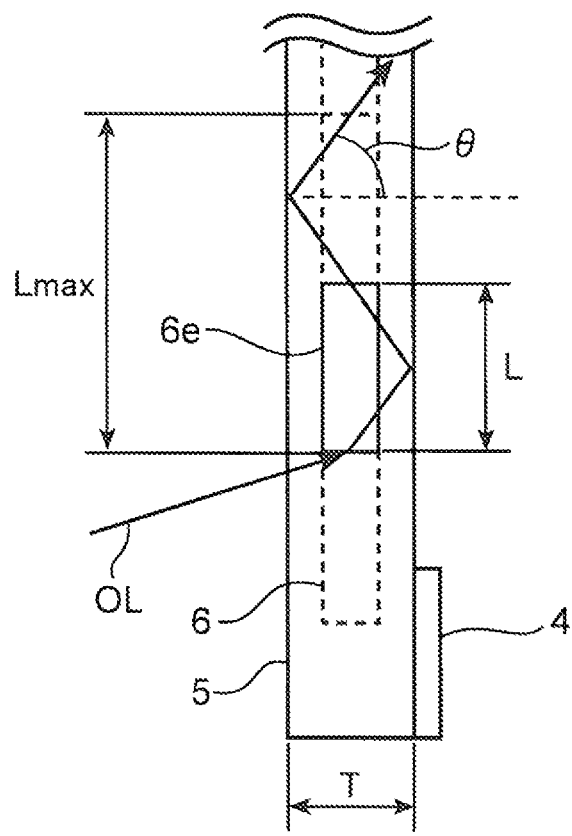
FIG. 5 is a diagram illustrating a length of a dynamic diffraction segment element and a thickness of the light guiding plate in the first embodiment of the invention.

Further, the size of the dynamic diffraction segment elements 6a to 6f to be used in the embodiment is described referring to FIG. 5. As described in the above example, stray light is not generated even when external light is diffracted on the dynamic diffraction segment element whose diffraction function is validated, and causes total reflection within the light guiding plate 5, as far as the light is not diffracted again on the dynamic diffraction segment element whose diffraction function is invalidated. In view of the above, it is preferable to set the length L of the dynamic diffraction segment element 6e to be smaller than the value of Lmax as expressed by the following formula (1), assuming that θ is the reflection angle of display light or external light OL within the light guiding plate 5, and T is the thickness of the light guiding plate 5.

$$L < L\max = 2 \times T \times \tan \theta \qquad (1)$$

Accordingly, as far as the length L of the dynamic diffraction segment elements 6a to 6f is smaller than Lmax, there is no likelihood that light diffracted on a dynamic diffraction segment element is diffracted on the dynamic diffraction segment element again. This makes it possible to suppress generation of stray light. The number of dynamic diffraction segment elements is not specifically limited. However, limiting the number of dynamic diffraction segment elements is advantageous in suppressing the processing cost necessary for controlling the dynamic diffraction segment elements, and in simplifying the configuration of the control circuit 7.

Further, the dynamic diffraction segment elements 6a to 6f may be implemented by a method for multiple-exposing interference fringes corresponding to the respective wavelengths of R, G, and B, or may be configured such that three layers of elements for the respective wavelengths are laminated. In the latter configuration, a process of validating the diffraction function of a dynamic diffraction segment element for each wavelength of R, G, B is performed in accordance with a timing of turning on the light source 1 during a time when the diffraction function of the dynamic diffraction segment element is validated.

As described above, constituting the dynamic output diffraction element 6 of the dynamic diffraction segment elements 6a to 6f makes it possible to maintain the wide eye box IB, while suppressing stray light resulting from external light.

Further, the pupil detection unit 9 is configured to acquire information relating to the eyeball position of the driver DR from the camera 10 or the like inside the car for detecting the eyeball position of the driver DR (user). The control circuit 7 selects the dynamic diffraction segment element 6 whose diffraction function is to be validated from among the dynamic diffraction segment elements 6a to 6f in response to a detection result of the pupil detection unit 9. For instance, the control circuit 7 selects, from the eyeball position of the driver DR, a dynamic diffraction segment element outputting diffraction light to be incident on the eyeball of the driver DR, and validates the selected dynamic diffraction segment element. Further, the control circuit 7 may control to prioritize validation of the diffraction function of a selected dynamic diffraction segment element by e.g. increasing the number of times of validating the selected dynamic diffraction segment element. According to the above configurations, it is possible to collect the display light on the eyeball of the driver DR. This is advantageous in enhancing the luminance of the virtual image VI to be visually recognized by the driver DR. When the above control is not performed, the pupil detection unit 9 and the camera 10 may be omitted.

Further, the input unit 8 is a user interface (UI) unit which receives various inputs from the driver DR. When the driver DR inputs position information of his or her eyeball (information relating to a position easily and visually recognizable by the driver DR) with use of the input unit 8, the control circuit 7 selects the dynamic diffraction segment element 6 whose diffraction function is to be validated from among the dynamic diffraction segment elements 6a to 6f in response to the position information input from the input unit 8. For instance, the control circuit 7 selects a dynamic diffraction segment element outputting diffraction light to be incident on the eyeball of the driver DR from the position information input from the input unit 8. Further, the control circuit 7 may control to prioritize validation of the diffraction function of a selected dynamic diffraction segment element by e.g. increasing the number of times of validating the selected dynamic diffraction segment element. The above configurations are advantageous in prioritizing use of light from the dynamic diffraction segment element located at a position easily viewable by the driver DR for increasing the display luminance. When the above control is not performed, the input unit 8 may be omitted.

As described above, in the embodiment, the dynamic output diffraction element 6 is controlled in such a manner that one dynamic diffraction segment element whose diffraction function is validated is selected each at a time from among the dynamic diffraction segment elements 6a to 6f. This makes it possible to prevent external light diffracted on the dynamic diffraction segment element whose diffraction function is validated from being diffracted on another dynamic diffraction element. This is advantageous in suppressing generation of stray light. As a result, it is possible to prevent stray light resulting from external light to thereby enhance the visibility of the user, and to miniaturize the optical system.

Second Embodiment

Figure 6:
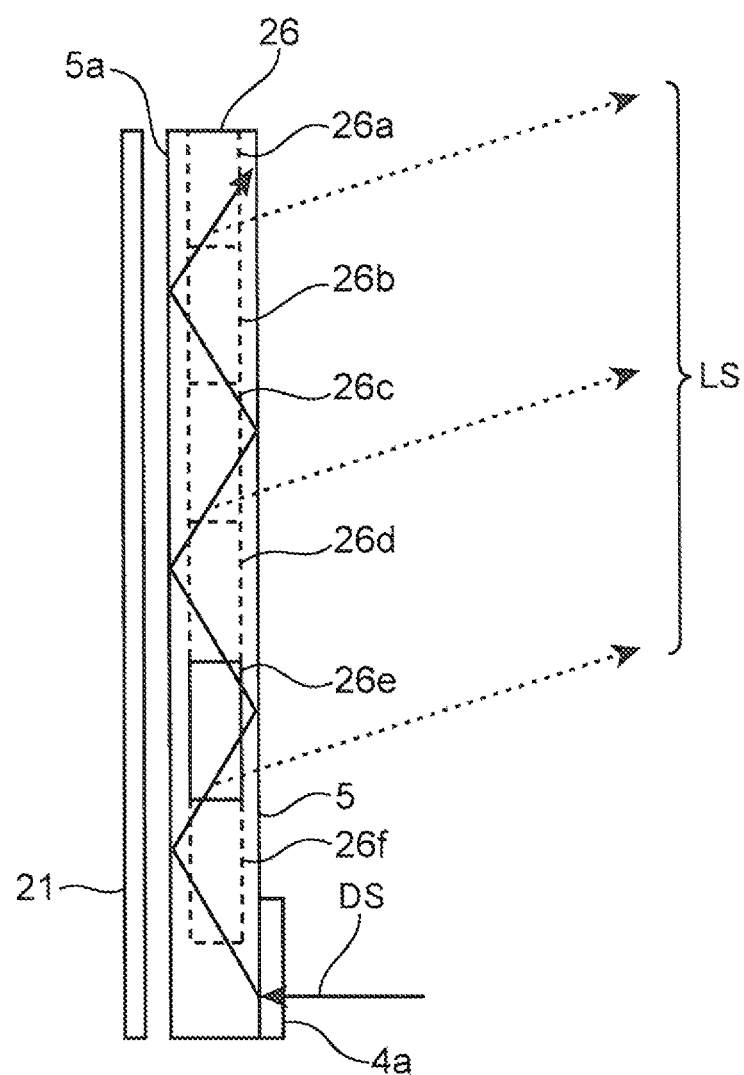
FIG. 6 is a diagram illustrating a configuration example of a light guiding plate and of a polarizing plate to be used in a HUD according to the second embodiment of the invention.

In the embodiment, there is described a method for suppressing generation of stray light in a HUD optical system employing a light guiding plate. FIG. 6 is a diagram illustrating a configuration example of a light guiding plate and a polarizing plate to be used in the second embodiment of the invention. The configuration of the HUD in the embodiment is substantially the same as the configuration in FIG. 1 except that the incident diffraction element 4 and the light guiding plate 5 illustrated in FIG. 1 are changed to an incident diffraction element 4a and a light guiding plate 5a, and that a polarizing plate 21 is disposed on the side of the light guiding plate 5a provided with the incident diffraction element 4a, on which external light is incident. Accordingly, illustration and description of the constituent elements substantially the same as those in the first embodiment are omitted.

As illustrated in FIG. 6, in the embodiment, the polarizing plate 21 is disposed on the front surface of the light guiding plate 5a (on the outside of the car). The polarizing plate 21 has a function of transmitting only polarized light in a specific direction. In the embodiment, light oscillating in a direction perpendicular to the plane of FIG. 6 is regarded as P polarized light, and light oscillating in a direction in parallel to the plane is regarded as S polarized light. In the embodiment, the polarizing plate 21 disposed on the front surface of the light guiding plate 5 is configured to transmit only P polarized light, for instance.

Further, in the embodiment, display light DS to be output from the display element 3 (see FIG. 1) and incident on the light guiding plate 5a is configured to be S polarized light. The above setting may be performed by e.g. causing the light source 1 (see FIG. 1) to output S polarized light, or by disposing a wave plate for converting light from the display element 3 into S polarized light. Further, polarization of light may be adjusted by another method.

The display light DS, which is adjusted to be S-polarized light, is incident on the incident diffraction element 4a. The incident diffraction element 4a is configured to have a polarization dependency such that S polarized light is diffracted.

Likewise, in the embodiment, a dynamic output diffraction element 26 has substantially the same configuration as the dynamic output diffraction element 6 illustrated in FIG. 1, and is configured no have a polarization dependency such that only S polarized light is diffracted. Specifically, the dynamic diffraction segment elements 26a to 26f are configured to have a polarization dependency such that only S polarized light is diffracted. Accordingly, when P polarized light is incident on the dynamic output diffraction element 26, diffraction is not performed even when the light satisfies a diffraction condition relating to the angle and the wavelength.

It is not necessary to limit the dynamic output diffraction element 26 for diffracting only specific linearly polarized light to an element of a specific type. However, it is possible to use a volume hologram produced by exposing a photopolymer plate, for instance. The above configuration makes it possible to implement a diffraction element for diffracting only light of an S polarized component. Further, it is possible to use a diffraction element manufactured by a method for recording interference fringes in a liquid crystal material.

Further, as well as the first embodiment, in the embodiment, the control circuit 7 (see FIG. 1) controls the dynamic output diffraction element 26 in such a manner that one dynamic diffraction segment element whose diffraction function is validated is selected each at a time from among the dynamic diffraction segment elements 26a to 26f. The embodiment is not specifically limited to the above example, but another control method may be used. Further, it is possible to use an output diffraction element configured to have a polarization dependency such that only S polarized light is diffracted, in place of using the dynamic output diffraction element 26.

Figure 7:
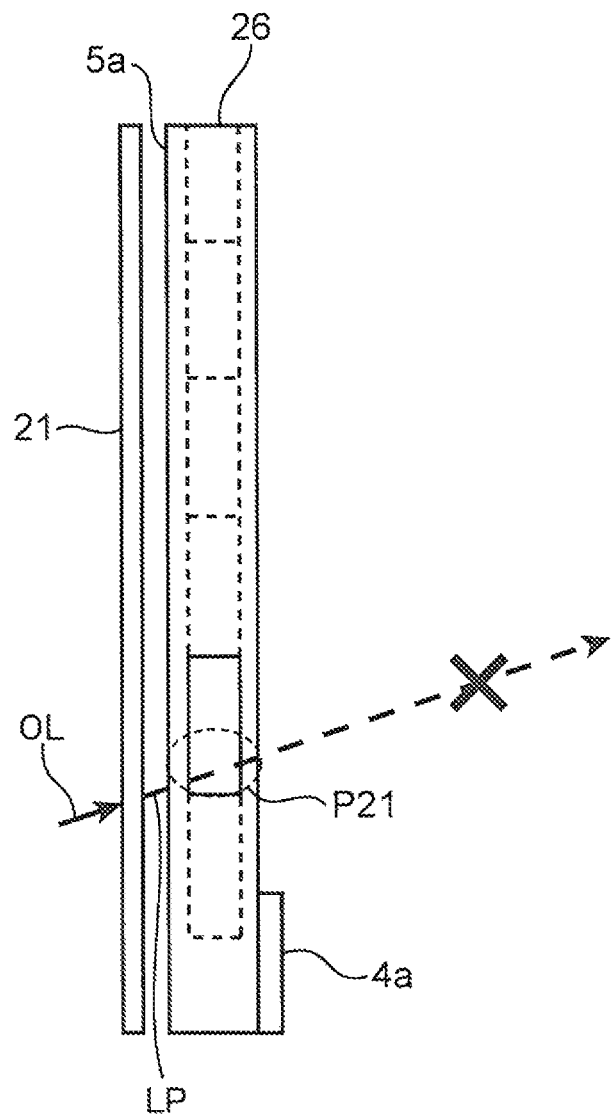
FIG. 7 is a schematic diagram for describing prevention of stray light resulting from external light in the second embodiment of the invention.

Next, there is described a configuration as to how stray light resulting from external light is prevented in the embodiment referring to FIG. 7. Generally, external light is regarded as randomly polarized light including various polarized components. Accordingly, when external light OL passes through the polarizing plate 21, only the P polarized component is transmitted, and the external light OL is converted into P polarized light LP. As described above, the dynamic output diffraction element 26 is configured to diffract only an S polarized component. Accordingly, even when the external light OL is incident on the dynamic output diffraction element 26 at the broken line portion P21, diffraction is not performed. This prevents stray light resulting from the external light OL, and allows for the driver to visually recognize a virtual image without feeling annoyed.

In the embodiment, there is used an example, in which the dynamic output diffraction element 26 diffracts S polarized light. Alternatively, the polarizing plate 21 may block P polarized light, and the dynamic output diffraction element 26 may diffract the P polarized light. Further, when the driver uses polarized sunglasses, the dynamic output diffraction element 26 may be configured to diffract linearly polarized light in a direction along which light is not blocked by the polarized sunglasses. The above configuration is also advantageous in preventing disappearance of a virtual image from the view of the driver wearing the sunglasses.

Third Embodiment

In the embodiment, there is described a measure against light scattering involved when a diffraction element is a dynamic diffraction element. As described above, the dynamic diffraction element is an element configured to record interference fringes in a material such as liquid crystal, and to validate or invalidate the diffraction function due to the interference fringes by voltage application. Generally, voltage application is performed by mounting a dynamic diffraction element on a transparent electrode in order to apply a voltage to the dynamic diffraction element. Use of the transparent electrode makes it possible to use the dynamic diffraction element as an output diffraction element within a light guiding plate, even in use of a see-through display through which the user visually recognizes the outside world, such as a HUD. Further, it is often the case that an ITO (Indium Tin Oxide) film having a high transmittance of visible light, and a high conductivity is used as the transparent electrode.

However, when a dynamic diffraction element having an ITO film is used as an output diffraction element in an optical system employing a light guiding plate, light scattering due to the ITO film may occur. This example is described referring to FIG. 8.

Figure 8:
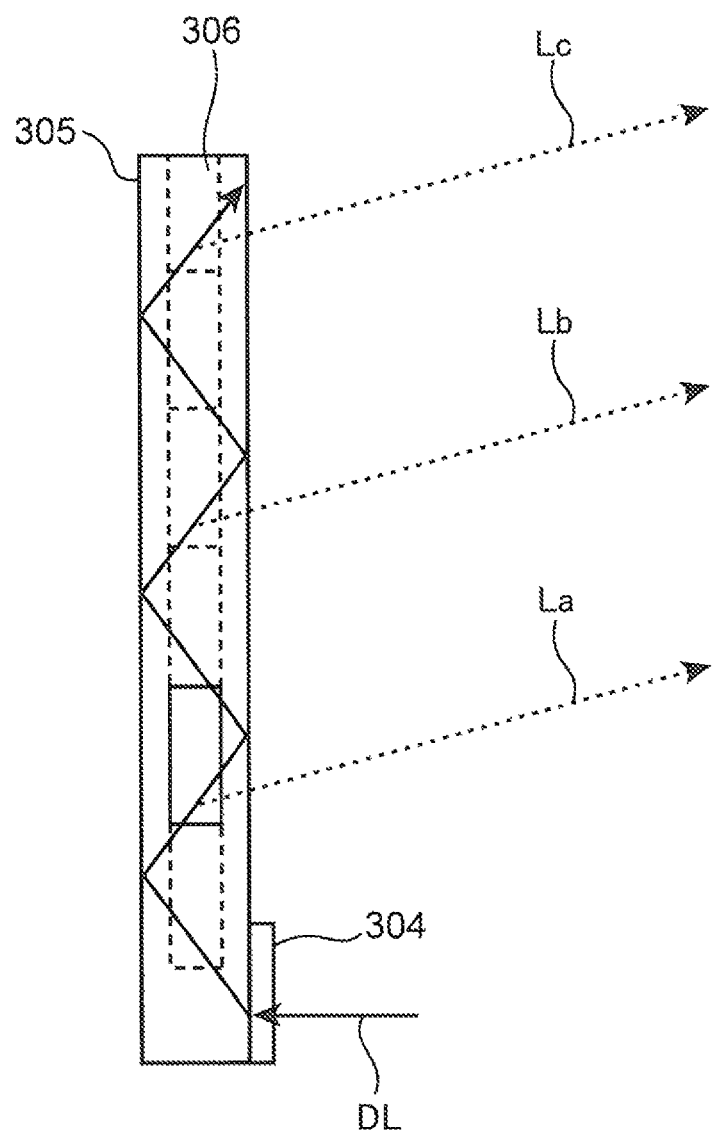
FIG. 8 is a schematic diagram for describing an influence of scattering light when a dynamic diffraction element provided with an ITO film is used as an output diffraction element.

In FIG. 8, a dynamic diffraction element 306 provided with an ITO film is used as an output diffraction element for extracting display light DL from the light guiding plate 305. In the example of FIG. 8, display light DL incident on the light guiding plate 305 through the incident diffraction element 304 is diffracted on the dynamic diffraction element 306, and the light guiding plate 305 outputs diffraction light La, Lb, and Lc. At the time of incidence, each of the diffraction light La, Lb, and Lc is affected by light scattering due to the ITO film depending on the number of times of passing through the dynamic diffraction element 306.

For instance, the diffraction light La passes through the dynamic diffraction element 306 one time, the diffraction light Lb passes through the dynamic diffraction element 306 three times, and the diffraction light Lc passes through the dynamic diffraction element 306 five times. As the number of times of passing through the ITO film (the dynamic diffraction element 306) increases, light scattering due to the ITO film is likely to occur, and the image quality of a display image is deteriorated when the driver visually recognizes the light.

As described above, in FIG. 8, the number of times of passing through the dynamic diffraction element 306 increases, as the diffraction light is output from a further upper position of the light guiding plate 305. A virtual image to be visually recognized by the driver when the eyeball position of the driver is above the eye box is likely to be blurred, as compared with a virtual image to be visually recognized when the eyeball position of the driver is located below the eye box. Thus, there occurs a phenomenon such that the image quality of a display image largely varies depending on the eyeball position of the driver in the eye box.

Figure 9:
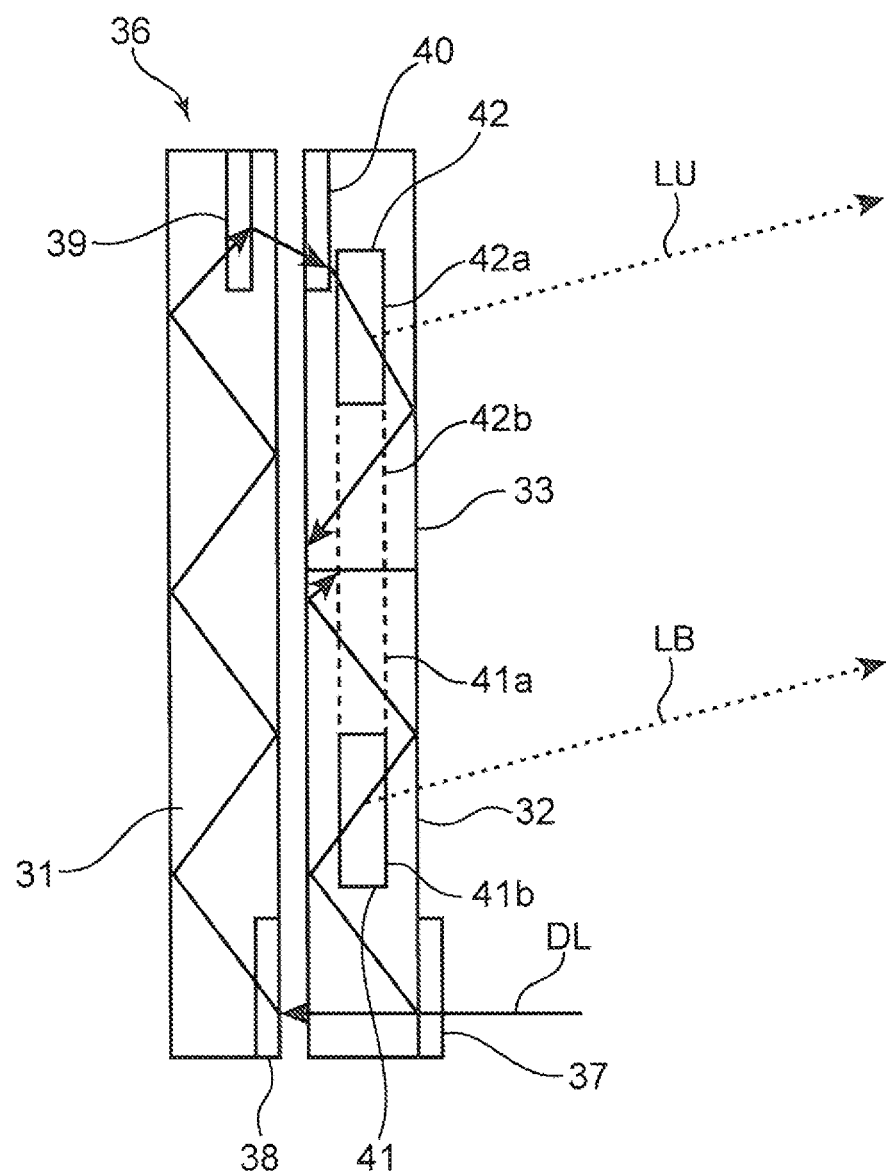
FIG. 9 is a diagram illustrating a configuration example of a light guiding plate to be used in a HUD according to the third embodiment of the invention.

FIG. 9 illustrates a configuration of the light guiding plate in the embodiment in order to solve the above problem. The configuration of the HUD in the embodiment is substantially the same as the configuration in FIG. 1 in the constituent elements except for the light guiding plate. Accordingly, illustration and description of the constituent elements in the embodiment substantially the same as those in the first embodiment are omitted.

As illustrated in FIG. 9, in the embodiment, a light guiding plate 36 is constituted of a bypass light guiding plate 31, a lower light guiding plate 32, and an upper light guiding plate 33. The lower light guiding plate 32 is configured to divide display light DL into first display light and second display light for causing the first display light to propagate therein. The bypass light guiding plate 31 is configured to receive the second display light to be output from the lower light guiding plate 32 for causing the second display light to propagate therein. The upper light guiding plate 33 is disposed on the same side as the lower light guiding plate 32 with respect to the bypass light guiding plate 31, and to receive the second display light to be output from the bypass light guiding plate 31 for causing the second display light to propagate therein.

A lower dynamic diffraction element 41 is provided in the lower light guiding plate 32 for outputting the first display light to the outside of the lower light guiding plate 32. An upper dynamic diffraction element 42 is provided in the upper light guiding plate 33 for outputting the second display light to the outside of the upper light guiding plate 33.

As described above, a part (first display light) of the display light DL from the display element 3 (see FIG. 1) is diffracted in such a manner that total reflection is performed within the lower light guiding plate 32 by an incident diffraction element 37 provided on the lower light guiding plate 32. Light subjected to total reflection within the lower light guiding plate 32 is diffracted on the lower dynamic diffraction element 41, and is output from the lower light guiding plate 32 as lower diffraction light LB.

Specifically, the lower dynamic diffraction element 41 is constituted of a plurality of dynamic diffraction segment elements e.g. two dynamic diffraction segment elements 41a and 41b configured such that the diffraction function of diffracting light is invalidated or validated by voltage application. In the example illustrated in FIG. 9, the control circuit 7 (see FIG. 1) controls to select one element having a diffraction function at a certain point of time from among the dynamic diffraction segment elements 41a and 41b, whereby only the diffraction function of the dynamic diffraction segment element 41b indicated by the solid line is validated, and the diffraction function of the dynamic diffraction segment element 41a indicated by the broken line is invalidated. Accordingly, light subjected to total reflection within the lower light guiding plate 32 is diffracted on the dynamic diffraction segment element 41b, and is output from the lower light guiding plate 32 as lower diffraction light LB. The number of the dynamic diffraction segment elements 41a and 41b is not specifically limited to the above example, but various modifications are applicable.

Further, in the embodiment, the diffraction efficiency of the incident diffraction element 37 is suppressed to be 50% or lower. A part of the display light DL, e.g. a half of the display light (second display light) is transmitted through the lower light guiding plate 32 without being diffracted on the incident diffraction element 37. Thereafter, the light transmitted through the lower light guiding plate 32 is diffracted on the incident diffraction element 38 provided in the bypass light guiding plate 31, and is totally reflected within the bypass light guiding plate 31. The light subjected to total reflection within the bypass light guiding plate 31 is diffracted on an output diffraction element 39, and is output from the bypass light guiding plate 31.

The light output from the bypass light guiding plate 31 is diffracted on the incident diffraction element 40 provided in the upper light guiding plate 33, and travels while causing total reflection within the upper light guiding plate 33. The light subjected to total reflection within the upper light guiding plate 33 is diffracted on the upper dynamic diffraction element 42, and is output as upper diffraction light LU.

Specifically, the upper dynamic diffraction element 42 is constituted of a plurality of dynamic diffraction segment elements e.g. two dynamic diffraction segment elements 42a and 42b configured such that the diffraction function of diffracting light is invalidated or validated by voltage application. In the example illustrated in FIG. 9, the control circuit 7 (see FIG. 1) controls to select one element having a diffraction function at a certain point of time from among the dynamic diffraction segment elements 42a and 42b, whereby only the diffraction function of the dynamic diffraction segment element 42b indicated by the solid line is validated, and the diffraction function of the dynamic diffraction segment element 42a indicated by the broken line is invalidated. Accordingly, light subjected to total reflection within the upper light guiding plate 33 is diffracted on the dynamic diffraction segment element 42a, and is output from the upper light guiding plate 33 as upper diffraction light LU.

The number of the dynamic diffraction segment elements 42a and 42b is not specifically limited to the above example, but various modifications are applicable. Further, the combination of dynamic diffraction segment elements whose diffraction function is to be validated is not specifically limited to the above example, but various modifications are applicable.

As described above, in the embodiment, dynamic diffraction elements having an ITO film are only two i.e. the lower dynamic diffraction element 41 and the upper dynamic diffraction element 42. A dynamic diffraction element is divided into upper and lower portions. Accordingly, there is no large difference between the number of times of causing the light to pass through the lower dynamic diffraction element 41, and the number of times of causing the light to pass through the upper dynamic diffraction element 42. This allows for light scattering duo to the ITO film to be minimum and uniform. Specifically, the lower diffraction light LB passes through the lower dynamic diffraction element 41 one time, and the upper diffraction light LU passes through the upper dynamic diffraction element 42 one time. The number of times of causing the lower diffraction light LB to pass through the ITO film and the number of times of causing the upper diffraction light LU to pass through the ITO film are made to be uniform. This is advantageous in preventing a large variation in the image quality of a virtual image depending on the eyeball position of the driver within the eye box.

Fourth Embodiment

In the embodiment, there is described a configuration of a HUD employing two light guiding plates. In the configuration of the HUD employing a light guiding plate as described in the first embodiment referring to FIG. 1, only one light guiding plate is used. This configuration makes it possible to enlarge the eye box in a vertical direction. On the other hand, when the eye box is enlarged in a horizontal direction as well as in a vertical direction, a configuration of combining two light guiding plates is used. In the embodiment, this example is described referring to FIG. 10 to FIG. 12. A light source, an incident optical system, a control circuit, a HUD housing, and the like in the embodiment are substantially the same as those in the first embodiment, and accordingly, description and illustration thereof are omitted.

Figure 10:
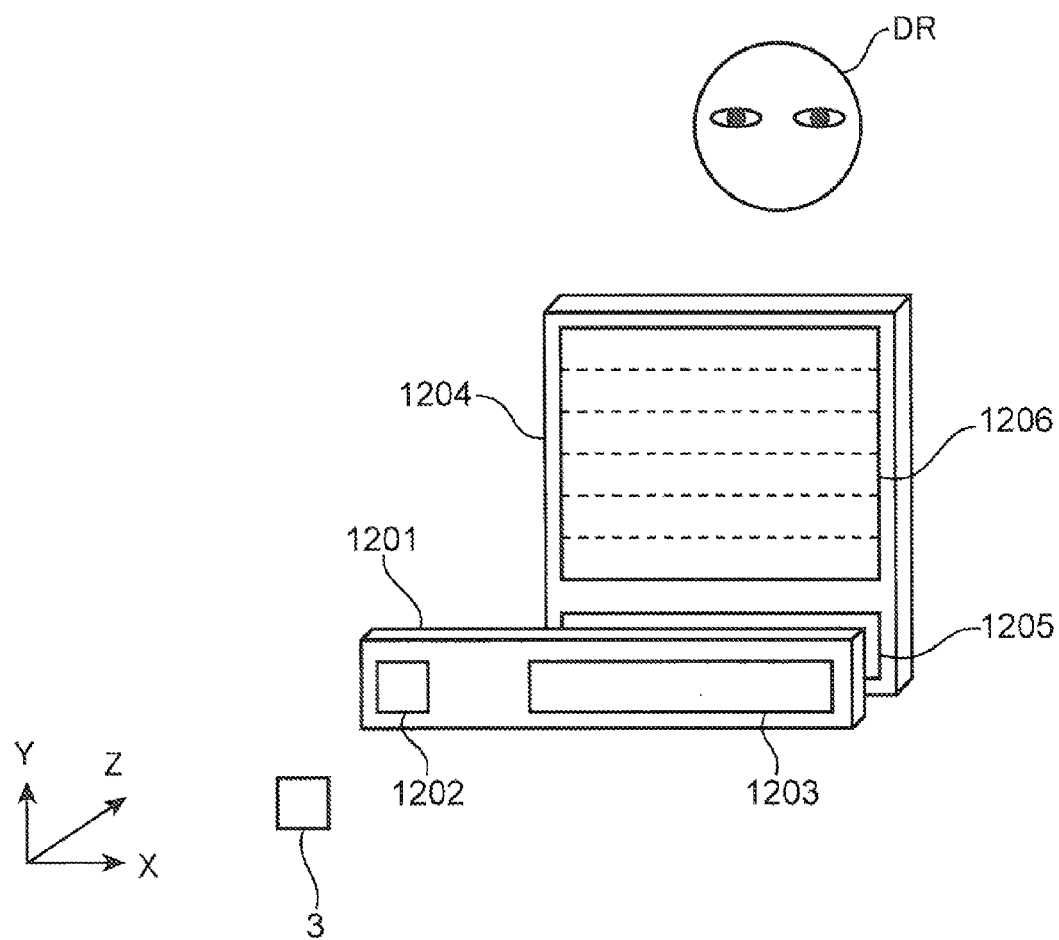
FIG. 10 is a schematic diagram illustrating a configuration of a HUD according to the fourth embodiment of the invention.

In FIG. 10, a light guiding plate of a HUD is constituted of a horizontal-direction light guiding plate 1201 configured to enlarge the eye box in a horizontal direction (X axis), and a vertical-direction light guiding plate 1204 configured to enlarge the eye box in a vertical direction (Y axis). Further, the components are disposed in such a manner that a display element 3, the horizontal-direction light guiding plate 1201, the vertical-direction light guiding plate 1204, and the driver DR are arranged in this order along the depth direction (Z axis).

Figure 11:
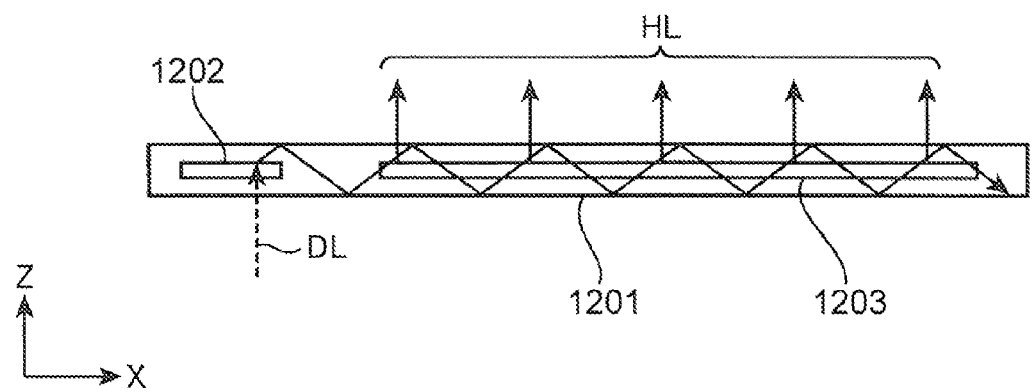
FIG. 11 is a diagram illustrating a configuration example of a horizontal-direction light guiding plate illustrated in FIG. 10.

Next, FIG. 11 illustrates the configuration of the horizontal-direction light guiding plate 1201. The horizontal-direction light guiding plate 1201 is provided with an incident diffraction element 1202 and an output diffraction element 1203. The horizontal-direction light guiding plate 1201 is configured to receive display light DL for causing the display light DL to propagate therein, and to output diffraction light HL in which the display light DL is enlarged in a horizontal direction.

Specifically, the display light DL from the display element 3 is diffracted on the incident diffraction element 1202, and travels while causing total reflection within the horizontal-direction light guiding plate 1201. The light subjected to total reflection within the horizontal-direction light guiding plate 1201 is diffracted on the output diffraction element 1203, and is output from the light guiding plate 1201 as diffraction light HL.

Figure 12:
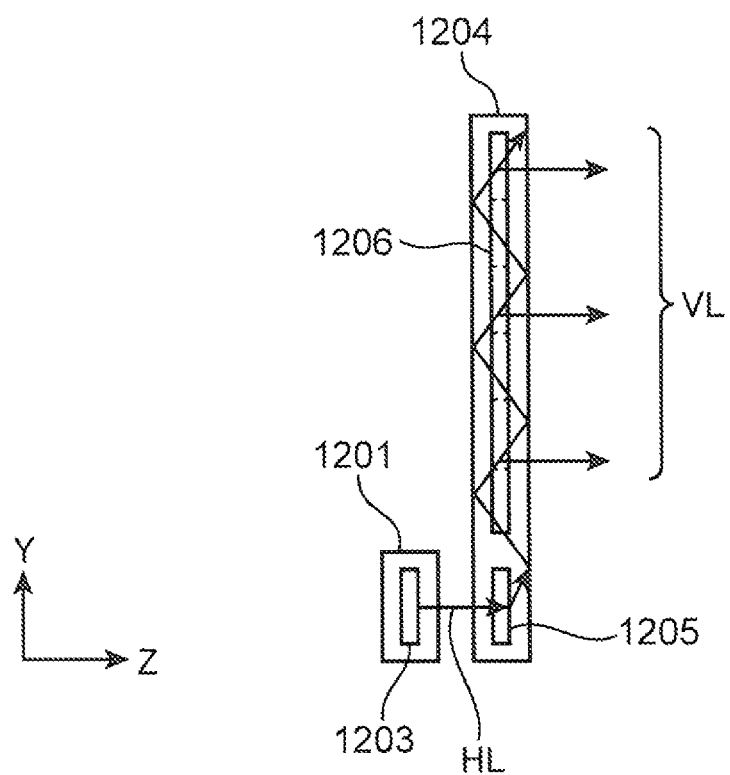
FIG. 12 is a diagram illustrating a configuration example of a vertical-direction light guiding plate illustrated in FIG. 10.

Next, FIG. 12 illustrates a configuration of the vertical-direction light guiding plate 1204. The vertical-direction light guiding plate 1204 is provided with an incident diffraction element 1205 and a dynamic output diffraction element 1206. The vertical-direction light guiding plate 1204 is configured to receive diffraction light HL to be output from the horizontal-direction light guiding plate 1201 for causing the diffraction light HL to propagate therein, and to output diffraction light VL in which the diffraction light HL is enlarged in a vertical direction. The dynamic output diffraction element 1206 is provided in the vertical-direction light guiding plate 1204 for outputting the diffraction light VL to the outside of the second light guiding plate.

Specifically, as well as the first embodiment, the dynamic output diffraction element 1206 is constituted of a plurality of dynamic diffraction segment elements aligned in a vertical direction, and a control circuit 7 controls the voltage to be applied to the dynamic diffraction segment elements, whereby it is possible to validate or invalidate the diffraction function of the dynamic diffraction segment elements. For instance, the control circuit 7 controls the dynamic output diffraction element 1206 in such a manner that one element having a diffraction function at a certain point of time is selected from among the dynamic diffraction segment elements. The embodiment is not limited to the above example, but another control method may be used.

According to the above configuration, the diffraction light HL output from the horizontal-direction light guiding plate 1201 is diffracted on the incident diffraction element 1205 in a vertical direction, and travels while causing total reflection within the vertical-direction light guiding plate 1204. The light subjected to total reflection within the vertical-direction light guiding plate 1204 is diffracted on the dynamic output diffraction element 1206, and is output from the vertical-direction light guiding plate 1204 as diffraction light VL.

As a result of the above operation, the diffraction light VL impinges on the eyeball of the driver DR. Thus, the driver DR can visually recognize a virtual image. The range of diffraction light VL to be output from the vertical-direction light guiding plate 1204 is largely enlarged in a horizontal direction and in a vertical direction by the diffraction elements (the output diffraction element 1203 and the dynamic output diffraction element 1206) within the two light guiding plates 1201 and 1204. This makes it possible to provide the driver DR with a wide eye box.

However, when the diffraction element is provided with an ITO film, as well as the third embodiment, there occurs a problem such that the image quality of a virtual image to be displayed varies depending on the number of times of passing through the diffraction element.

Figure 13:
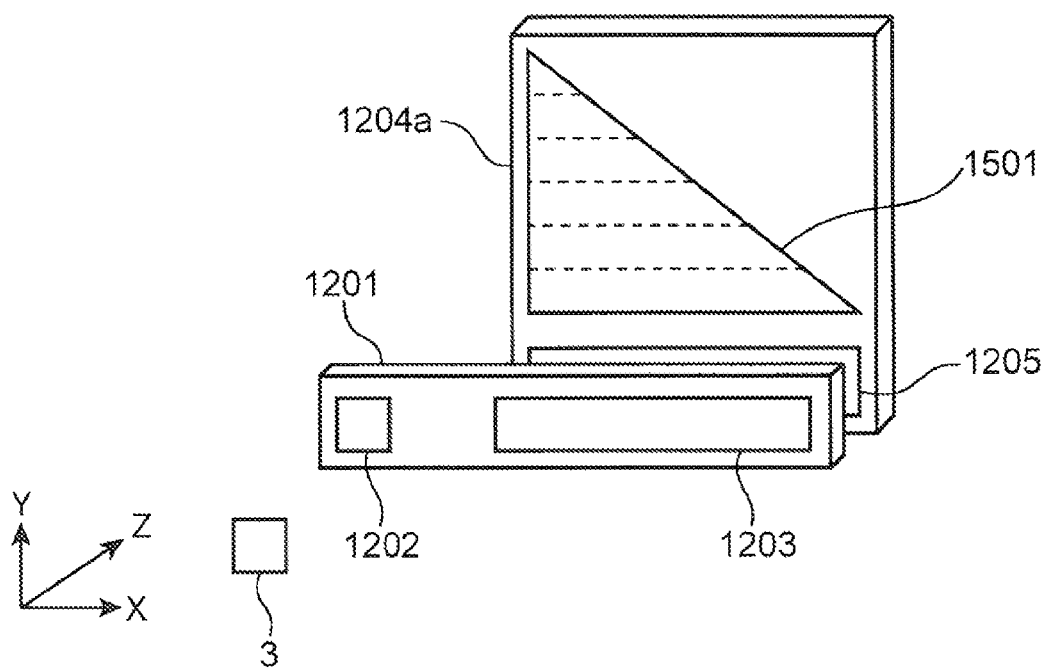
FIG. 13 is a diagram illustrating a configuration example of another light guiding plate to be used in the fourth according to the fourth embodiment of the invention.

In order to solve the above problem, in another example of the light guiding plate to be used in the HUD in the embodiment, the shape of the vertical-direction dynamic output diffraction element is changed. This example is illustrated in FIG. 13. FIG. 13 illustrates that the shape of a dynamic output diffraction element 1501 accommodated in a vertical-direction light guiding plate 1204a is a triangular shape, and the length of the dynamic output diffraction element 1501 in a vertical direction (Y-axis) increases toward the display element 3.

Specifically, the shape of the dynamic output diffraction element 1501 is configured in such a manner that the size of the dynamic output diffraction element 1501 increases (the height in y-axis direction increases), as the dynamic output diffraction element 1501 approaches the display element 3 in a horizontal direction (X-axis). Further, as well as the first embodiment, the dynamic output diffraction element 1501 is constituted of a plurality of dynamic diffraction segment elements aligned in a vertical direction, and a control circuit 7 controls the voltage to be applied to the elements, whereby it is possible to validate or invalidate the diffraction function of the elements. For instance, the control circuit 7 controls the dynamic output diffraction element 1501 in such a manner that one element having a diffraction function at a certain point of time is selected from among the dynamic diffraction segment elements. The embodiment is not specifically limited to the above example, but another control method may be used.

The number of times of causing diffraction light to be incident on the dynamic output diffraction element 1501 to pass through the output diffraction element 1203 provided in the horizontal-direction light guiding plate 1201 decreases, as the dynamic output diffraction element 1501 approaches the display element 3. In view of the above, the area of the dynamic output diffraction element 1501 is increased, as the dynamic output diffraction element 1501 approaches the display element 3 to thereby increase the number of times of causing diffraction light to pass through the dynamic output diffraction element 1501.

Figure 14:
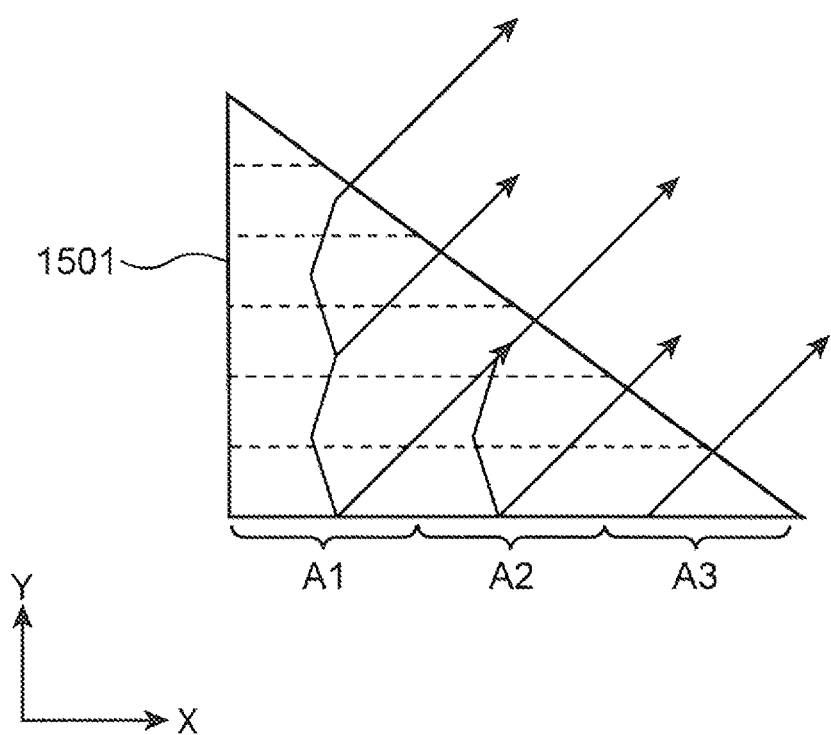
FIG. 14 is a schematic diagram for describing suppression of an influence of scattering light by the vertical-direction light guiding plate illustrated in FIG. 13.

The above example is illustrated in FIG. 14. In the example illustrated in FIG. 14, the dynamic output diffraction element 1501 is divided in a horizontal direction. Assuming that the divided areas are a first area A1, a second area A2, and a third area A3 in the order closest to the display element 3, the area of the first area A1 closest to the display element 3 is largest, and the area decreases in the order of the second area A2 and the third area A1. According to the above configuration, diffraction light that has passed through the dynamic output diffraction element 1501 multiple times is generated, and the number of times of causing the diffraction light to pass through the dynamic output diffraction element 1501 decreases in the order of the first area A1, the second area A2, and the third area A3.

According to the above configuration, in the example, it is possible to make the numbers of times of causing each diffraction light to be output from the light guiding plate 1204a to pass through the output diffraction element 1203 provided in the horizontal-direction light guiding plate 1201 and through the dynamic output diffraction element 1501 provided in the vertical-direction light guiding plate 1204a to be uniform, even in use of a diffraction element having an ITO film for the output diffraction element 1203 and for the dynamic output diffraction element 1501. This is advantageous in suppressing a variation in the image quality of a virtual image depending on the position within the eye box.

In the example, the shape of the dynamic output diffraction element 1501 is a triangular shape. The embodiment is not specifically limited to the above example. Any other shape may be used, as far as it is possible to make the numbers of times of causing each diffraction light to be output from the light guiding plate 1204a to pass through the output diffraction element 1203 and through the dynamic output diffraction element 1501 to be uniform. Further, the shape of the light guiding plate 1204a may be a triangular shape, as well as the dynamic output diffraction element 1501. The above configuration makes it possible to reduce the size of the light guiding plate. This is advantageous in reducing the capacity of the inside of a car necessary for loading a HUD.

Fifth Embodiment

In the embodiment, there is described a configuration of miniaturizing a projection optical system for projecting display light onto a light guiding plate.

Figure 15:
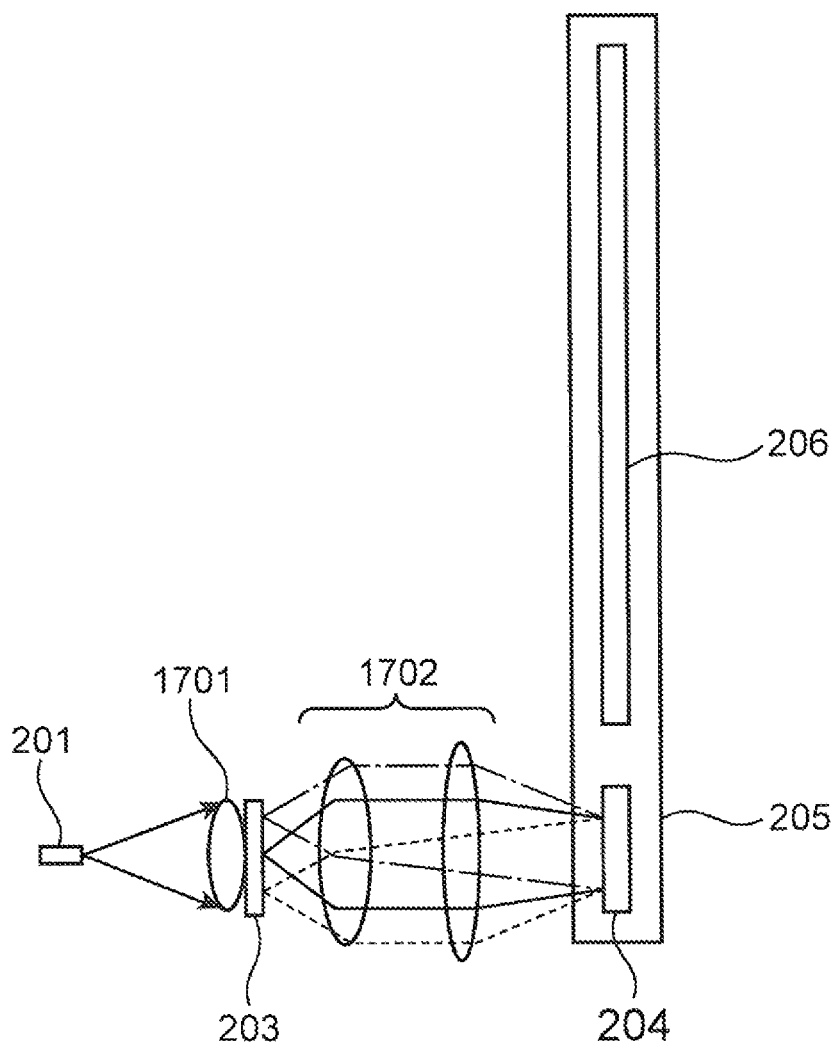
FIG. 15 is a diagram illustrating an example of a projection optical system of image light onto a light guiding plate.

FIG. 15 is a diagram illustrating an example of a projection optical system in a HUD employing an ordinary light guiding plate. In FIG. 15, light from a pixel in the middle of a screen is indicated by the solid line, light from a pixel at a lower position of the screen is indicated by the broken line, and light from a pixel at an upper position of the screen is indicated by the one-dotted chain line.

In the example of FIG. 15, light from a light source 201 is incident on a display element 203 as substantially parallel light through a collimator lens 1701. The display element 203 is a transmissive liquid crystal panel, and is configured to receive light from the light source 201 and to output display light to a projection lens system 1702. It is desirable to form the pupil of the projection lens system 1702 on an incident diffraction element 204 in order to efficiently allow incidence of light from the display element 203 into a light guiding plate 205.

In order to implement the above configuration, as illustrated in FIG. 15, there is used the projection lens system 1702 having a diameter larger than the diameter of the display element 203 and of the incident diffraction element 204. Use of the above configuration is advantageous in collecting the light on both ends of the display element 203 (an upper end and a lower end of the screen in FIG. 15) onto the incident diffraction element 204, as exemplified in FIG. 15. The above configuration, however, may oversize the projection optical system.

On the other hand, as a method for efficiently allowing incidence of light from a display element into a light guiding plate, while suppressing an increase in the size of a projection lens system, it is possible to use a computer generated hologram (hereinafter, called as "CGH"). In the embodiment, a CGH display element is used as the display element. A configuration example in this case is illustrated in FIG. 16.

Since the configuration of a control circuit, a HUD housing, and the like in the embodiment are substantially the same as those in the first embodiment, illustration and description thereof are omitted. Further, a dynamic output diffraction element 6 in the embodiment has substantially the same configuration as the dynamic output diffraction element in the first embodiment. As well as the first embodiment, the control circuit 7 (see FIG. 1) controls the dynamic output diffraction element 6 in such a manner that one dynamic diffraction segment element whose diffraction function is validated is selected each at a time from among the dynamic diffraction segment elements constituting the dynamic output diffraction element 6. The embodiment is not specifically limited to the above, but any other control method may be used.

Figure 16:
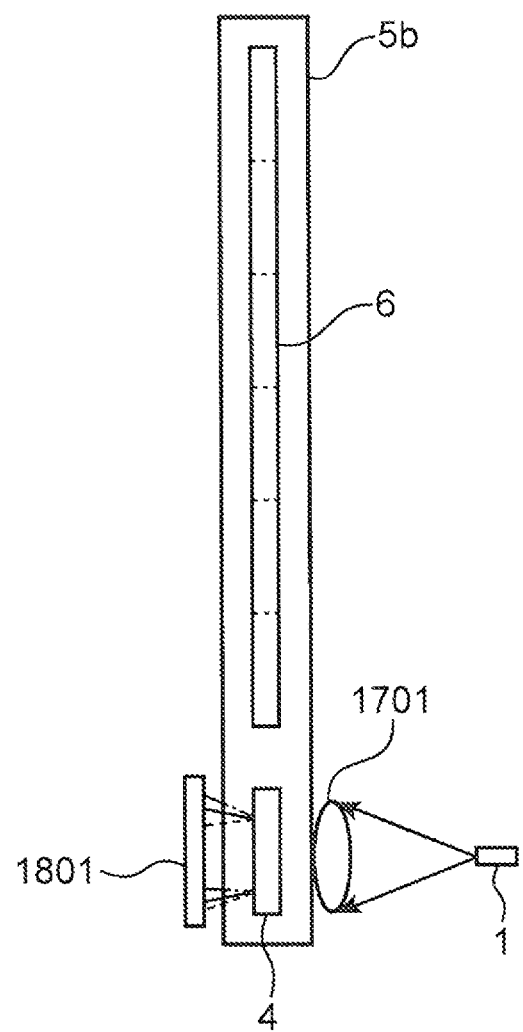
FIG. 16 is a diagram illustrating a configuration example of a CGH display element to be used in a HUD according to the fifth embodiment of the invention.

The HUD illustrated in FIG. 16 is provided with a light source 1, a collimator lens 1701 as an example of an incident optical system, a CGH display element 1801, an incident diffraction element 4, a light guiding plate 5b, and a dynamic output diffraction element 6. The incident diffraction element 4 and the dynamic output diffraction element 6 are provided in the light guiding plate 5b. The CGH display element 1801 is disposed to face the incident diffraction element 4 on the side of the light guiding plate 5b where external light is incident (on the side opposite to the light source 1 and the collimator lens 1701).

In FIG. 16, after light from the light source 1 is collimated into substantially parallel light through the collimator lens 1701, the substantially parallel light is transmitted through the light guiding plate 5b, and is incident on the CGH display element 1801. In the embodiment, the CGH display element 1801 is a phase-modulatable display element. A liquid crystal panel or the like may be used as the CGH display element 1801. Further, it is possible to use a display element employing a phase-controllable MEMS mirror, as the CGH display element 1801.

The CGH display element 1801 is configured to display interference fringes from a display image displayed at any position, as a phase hologram. Light from the light source 1 is diffracted on the CGH display element 1801, and is converted into display light from a display image displayed at any position. The display light from the CGH display element 1801 is incident on the incident diffraction element 4.

Use of the above configuration makes it possible to omit a projection lens system, and to miniaturize the HUD.

In the above configuration, a reflective display element (such as an LCOS or a DMD) is used as the CGH display element 1801. Alternatively, a transmissive element may be used. Generally, a reflective display element has a fast driving speed and a high light use efficiency. This is advantageous in enhancing the display image quality.

Further, a method for computing a phase hologram to be displayed on the CGH display element 1801 is not an essential matter of the invention. Accordingly, detailed description of the computing method is omitted. Any other method may be used as the computing method.

For instance, it is possible to perform computation by a point light source method, in which each of the pixels of a certain image at a predetermined distance from the CGH display element 1801 is defined as a point light source. In this method, a state in which light from a point light source overlaps on the CGH display element 1801 is computed, assuming that each pixel is a point light source, and the state is displayed as a hologram. According to the above configuration, it is possible to reproduce an image at any distance by the CGH display element 1801.

Further, it is possible to use a hologram computing method by e.g. performing a two-dimensional Fourier transform to an image to be displayed. The above configuration is advantageous in suppressing the cost required for computing a hologram. Further, generally, the CGH display element has a wavelength dependency. In view of the above, it is possible to use a method, in which a hologram is computed for each pixel of R, G, and B of an image to be displayed, and a hologram at each wavelength is displayed in accordance with a timing of turning on an RGB light source.

Sixth Embodiment

In the embodiment, there is described a method for suppressing generation of crosstalk in an optical system employing a light guiding plate and a diffraction plate. As described above, crosstalk indicates a phenomenon such that a diffraction element configured for a certain wavelength diffracts light of another wavelength.

Figure 17:
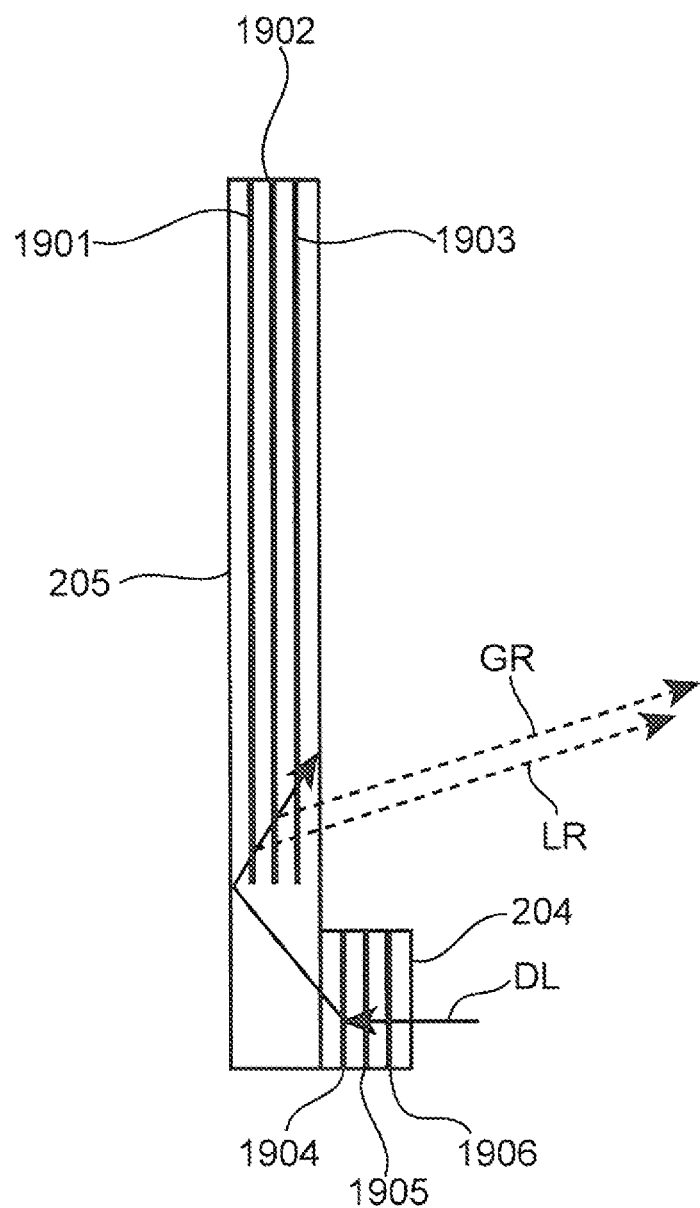
FIG. 17 is a schematic diagram for describing generation of crosstalk.

FIG. 17 illustrates an example of a light guiding plate in a HUD when crosstalk is generated. The example of FIG. 17 is a configuration example of a light guiding plate when a full color image is displayed. A light guiding plate 205 is provided with output diffraction elements 1901, 1902, and 1901 for the respective wavelengths of R, G, and B, as output diffraction elements. Likewise, an incident diffraction element 204 is constituted of incident diffraction elements 1904, 1905, and 1906 for the respective wavelengths of R, G, and B.

Generation of crosstalk is described with use of light in a red wavelength region (hereinafter, called as "R component") included in display light DL. The R component included in the display light DL is diffracted on the incident diffraction element 1904 for the red wavelength region, and is incident into the light guiding plate 205. After having been subjected to total reflection within the light guiding plate 205, the R component incident into the light guiding plate 205 is diffracted on the output diffraction element 1901 for the red wavelength region, and is output to the outside of the light guiding plate 205 as diffraction light LR.

However, when the wavelength selectivity (the wavelength region of light to be diffracted by a diffraction element) of each diffraction element is wide, the diffraction element may diffract light of a wavelength near the target wavelength. Generally, it is often the case that the wavelength of a light source to be used in an image display device is such that the red wavelength is near 630 nm, the green wavelength is near 530 nm, and the blue wavelength is near 440 nm. As described above, the red wavelength and the green wavelength, and the green wavelength and the blue wavelength are relatively close to each other in the wavelength. Accordingly, there may occur crosstalk resulting from diffraction of display light in the green wavelength region by the diffraction element for the red wavelength region, diffraction of display light in the red wavelength region by the diffraction element for the green wavelength region, diffraction of display light in a blue wavelength region by the diffraction element for the green wavelength region, or diffraction of display light in the green wavelength region by the diffraction element for the blue wavelength region.

FIG. 17 illustrates a case, in which the R component of display light DL is diffracted on the output diffraction element 1902 for the green wavelength region, and unwanted light GR is generated. Incidence of such unwanted light into the eyeball of the driver may result in recognition of a display image with color blur or image blur.

Figure 18:
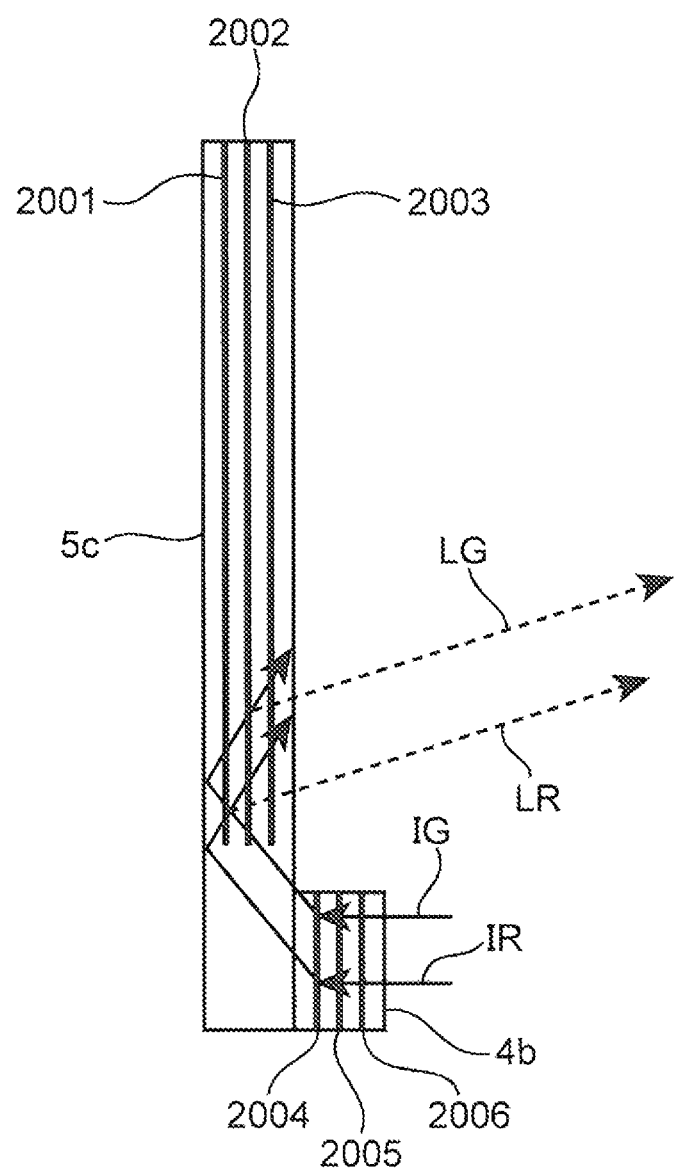
FIG. 18 is a diagram illustrating a configuration example of a light guiding plate to be used in a HUD according to the sixth embodiment of the invention.

FIG. 18 illustrates a configuration example of an optical system for preventing crosstalk as described above. The parts (such as the light source and the display element) until display light is incident into the light guiding plate, the control circuit, and the like in the embodiment are substantially the same as those in the other embodiments, and accordingly, illustration and description thereof are omitted. Further, dynamic output diffraction elements 2001, 2002, and 2003 in the embodiment have substantially the same configuration as the dynamic output diffraction element in the first embodiment. As well as the first embodiment, the control circuit 7 (see FIG. 1) controls each of the dynamic output diffraction elements 2001, 2002, and 2003 in such a manner that one dynamic diffraction segment element whose diffraction function is validated is selected from among the dynamic diffraction segment elements constituting each of the dynamic output diffraction elements 2001, 2002, and 2003. The embodiment is not specifically limited to the above example, but another control method may be used.

In FIG. 18, the dynamic output diffraction elements 2001, 2002, and 2003 for the respective wavelengths of R, G, and B are disposed in a light guiding plate 5*c*. In the embodiment, the dynamic output diffraction elements 2001, 2002, and 2003 have a polarization dependency. Further, the dynamic output diffraction element 2001 for the red wavelength region and the dynamic output diffraction element 2003 for the blue wavelength region have the same polarization dependency as each other. On the other hand, the dynamic output diffraction element 2002 for the green wavelength region is configured to have a polarization dependency different from the polarization dependency of the dynamic output diffraction elements 2001 and 2003.

It is assumed that linearly polarized light oscillating in a direction perpendicular to the plane of FIG. 18 is P polarized light, and linearly polarized light oscillating in a direction in parallel to the plane is S polarized light. For instance, when the dynamic output diffraction element 2002 for the green wavelength region retains a polarization dependency such that P polarized light is diffracted, the dynamic output diffraction elements 2001 and 2003 have a polarization dependency such that S polarized light is diffracted. Conversely to the above, when the dynamic output diffraction element 2002 for the green wavelength region diffracts S polarized light, the dynamic output diffraction elements 2001 and 2003 have a polarization dependency such that P polarized light is diffracted.

Likewise, an incident diffraction element 4*b* is constituted of diffraction elements 2004, 2005, and 2006 for the respective wavelengths of R, G, and B. The diffraction elements 2004, and 2005, and 2006 have a polarization dependency. Further, the diffraction element 2004 for the red wavelength region and the diffraction element 2006 for the blue wavelength region have the same polarization dependency as each other. On the other hand, the diffraction element 2005 for the green wavelength region has a polarization dependency different from the polarization dependency of the diffraction elements 2004 and 2006.

Further, the diffraction elements 2004, 2005, and 2006 have the same polarization dependency as the dynamic output diffraction elements 2001, 2002, and 2003 with respect to a wavelength. For instance, when the dynamic output diffraction element 2002 for the green wavelength region retains a polarization dependency such that P polarized light is diffracted, the diffraction element 2005 for the green wavelength region is also configured to have a polarization dependency such that P polarized light is diffracted.

Further, in the embodiment, light (R component) in the red wavelength region and light (B component) in the blue wavelength region out of the display light from the display element 3 (see FIG. 1) have the same linearly polarized component as each other. Further, light (G component) in the green wavelength region out of the display light has a linearly polarized component different from the linearly polarized component of the R component and of the B component. For instance, when the G component is P polarized light, the R component and the B component are configured to be S polarized light. Further, the respective wavelength components of display light have a polarization coincident with the polarization dependency of the dynamic output diffraction elements 2001, 2002, and 2003. For instance, when the dynamic output diffraction element 2002 for the green wavelength region retains a polarization dependency such that P polarized light is diffracted, the G component of display light is configured to be P polarized light.

Next, a configuration of suppressing generation of crosstalk with use of a R component IR and a G component IG of display light is described. It is assumed that the R component IR is S polarized light, and the G component IG is P polarized light. The R component IR is diffracted on the diffraction element 2004 for the red wavelength region having a polarization dependency such that S polarized light is diffracted, and is incident into a light guiding plate 5*a*.

On the other hand, and the diffraction element 2005 for the green wavelength region close to the diffraction element 2004 for the red wavelength region in the wavelength region has a polarization dependency such that P polarized light is diffracted. Accordingly, crosstalk is not generated, without diffraction of the R component IR as S polarized light. Likewise, the R component IR is diffracted on the dynamic output diffraction element 2001 for the red wavelength region configured such that S polarized light is diffracted, and is output to the outside of the light guiding plate 5*c* as diffraction light LR. However, since the dynamic output diffraction element 2002 for the green wavelength region diffracts P polarized light, the dynamic output diffraction element 2002 does not diffract the R component IR as S polarized light. Accordingly, crosstalk is not generated, and unwanted light is not generated.

As well as the R component IR, the G component IG, is diffracted only on the diffraction element 2005 for the green wavelength region and on the dynamic output diffraction element 2002 for the green wavelength region having the same polarization dependency as each other. Accordingly, it is possible to suppress generation of crosstalk resulting from diffraction elements for the red wavelength region and for the green wavelength region close to each other in the wavelength region. Likewise, the B component is diffracted only on the diffraction element 2006 for the blue wavelength region and on the dynamic output diffraction element 2003 for the blue wavelength region having the same polarization dependency as each other. Accordingly, it is possible to suppress generation of crosstalk resulting from diffraction elements for the green wavelength region and for the blue wavelength region close to each other in the wavelength region.

In the embodiment, the R component and the B component are S polarized light, and the G component is P polarized light. The setting may be reversed to each other. Further, it is not necessary to limit the method for setting polarization of each wavelength component of display light to a specific method. Any method may be used. For instance, when the light source 1 (see FIG. 1) outputs light of a wavelength of R, G, B, the red wavelength component and the blue wavelength component may be configured to be the same linearly polarized light as each other, and the green wavelength component may be configured to be linearly polarized light in a polarization direction opposite to the polarization direction of the other wavelength components. Further, the light source 1 may be a laser light source configured to output linearly polarized light. The above configuration is advantageous in enhancing the light use efficiency of the light source. Further, it is possible to use a polarization state adjustment method by using an LED as the light source 1, and by causing the light to pass through a polarizing plate. The above configuration is advantageous in suppressing the cost of the light source.

Further, it is possible to use a dynamic wave plate configured to dynamically change the polarization state of display light from the display element 3. According to the above configuration, the light source 1 sequentially outputs light of R, G, and B. The display element 3 performs field sequential display of displaying pixels of R, G, and B as a display image in accordance with a timing of turning on the light source 1. The dynamic wave plate is configured to transmit e.g. the R component and the B component of display light without changing the polarization thereof. Further, the dynamic wave plate is operated to change the polarization during a time when the G component is displayed. Performing the above operation makes it possible to change the polarization state between the R component and the B component, and the G component. It is not necessary to limit the method of using a dynamic wave plate to a specific method. Any method may be used. For instance, a liquid crystal element may be used. Further, a configuration of changing the polarization of the R component and of the B component may be used.

Further, it is not necessary to limit the method for setting a polarization dependency of a diffraction element to a specific method. Any method may be used. It is possible to implement a diffraction element employing a volume hologram using e.g. photopolymer, or to adjust the polarization dependency by an exposure method. Further, it is possible to adjust the polarization dependency by changing the material for use in a volume hologram such as photopolymer or a liquid crystal material.

Seventh Embodiment

In the embodiment, there is described a measure against light amount loss in a configuration of enlarging an eye box with use of two light guiding plates. Since the configuration using two light guiding plates has already been described referring to FIG. 10 to FIG. 14, detailed description thereof is omitted.

First of all, light loss when light is incident from the horizontal-direction light guiding plate 1201 to the vertical-direction light guiding plate 1204 illustrated in FIG. 10 is described referring to FIG. 19 to FIG. 22.

Figure 19:
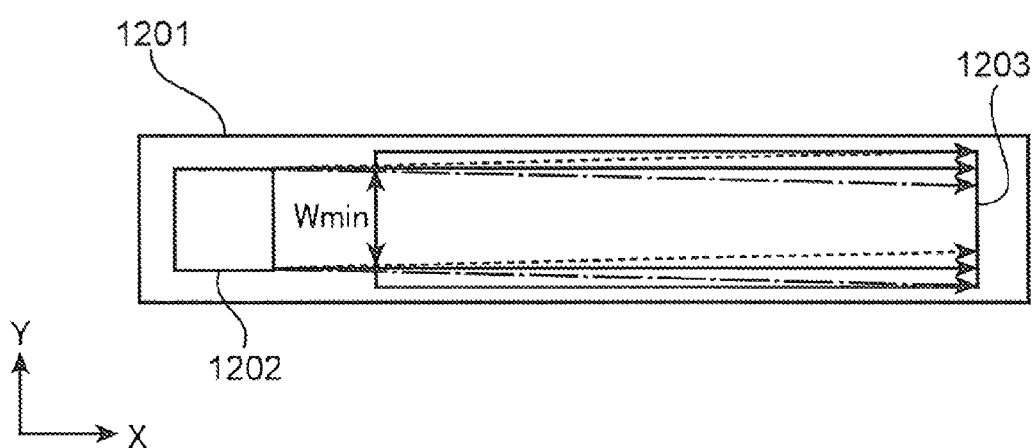
FIG. 19 is a diagram illustrating spread of light in a vertical direction on a horizontal-direction light guiding plate configured to enlarge light in a horizontal direction.

FIG. 19 is a diagram illustrating spread of light in a vertical direction on the horizontal-direction light guiding plate 1201 configured to enlarge light in a horizontal direction. In FIG. 19, light from a pixel in the middle of a screen is indicated by the solid line, light from a pixel at an upper position of the screen is indicated by the broken line, and light from a pixel at a lower position of the screen is indicated by the one-dotted chain line.

As illustrated in FIG. 19, display light from the display element 3 (see FIG. 10) propagates in the horizontal-direction light guiding plate 1201 by the incident diffraction element 1202. During the light propagation in a horizontal direction, the display light spreads in a vertical direction. This is a spread of display light by the amount corresponding to the angle of view in a vertical direction. Accordingly, the vertical direction width of display light to be incident on the output diffraction element 1203 decreases as the light approaches the incident diffraction element 1202, and increases as the light goes away from the incident diffraction element 1202. In other words, the vertical direction width of light to be output from the output diffraction element 1203 varies depending on the horizontal direction position. This is a cause of light loss in the vertical-direction light guiding plate 1204.

Figure 20:
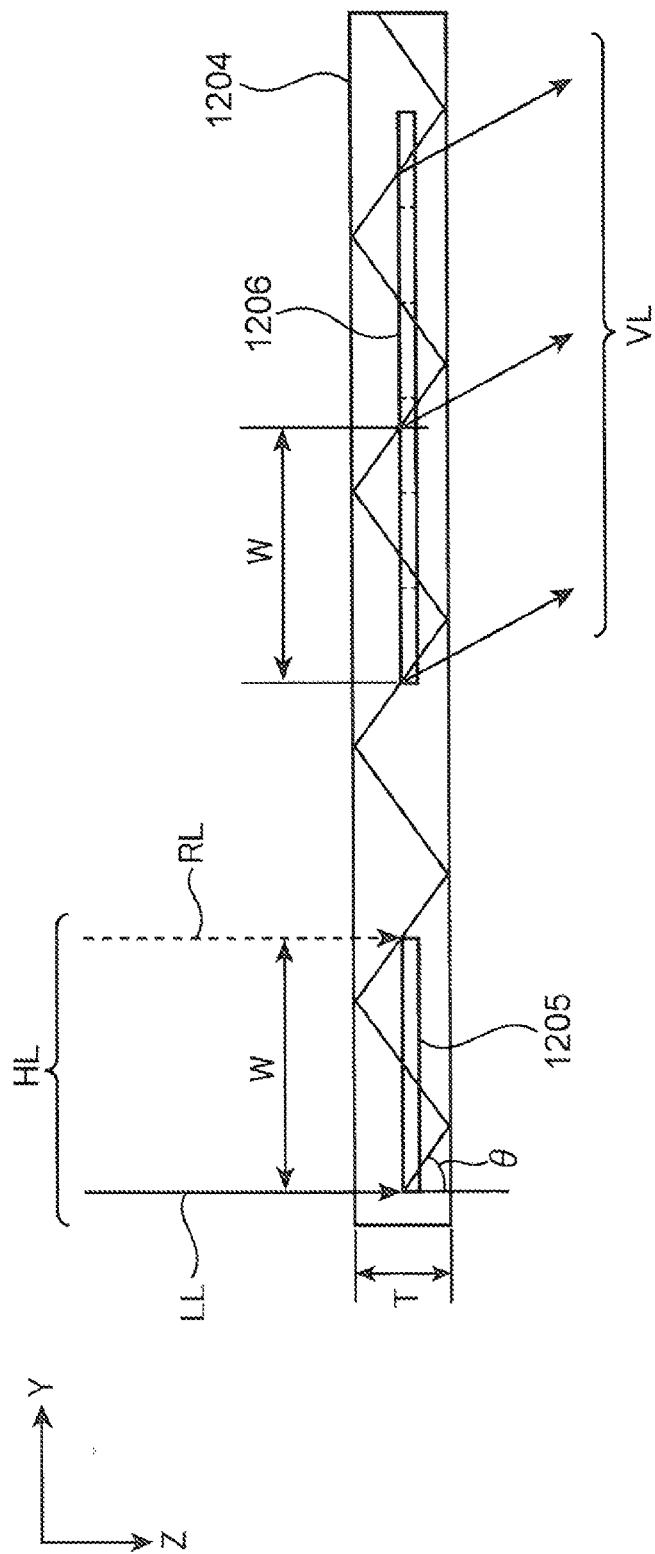
FIG. 20 is a diagram illustrating a relationship between an incident width on a light guiding plate, a diffraction angle, and a thickness of the light guiding plate.

Referring to FIG. 20, a condition for efficiently outputting diffraction light VL from the vertical-direction light guiding plate 1204 is described. Assuming that $\theta$ is the diffraction angle of the incident diffraction element 1205 provided in the vertical-direction light guiding plate 1204, T is the thickness of the vertical-direction light guiding plate 1204, and W is the incident width of diffraction light HL to be incident on the incident diffraction element 1205, $\theta$, T, and W satisfy the relationship as expressed by the following formula (2).

$$T = W/(2 \times \tan \theta) \quad (2)$$

In the above configuration, left-end light LL of the diffraction light HL is diffracted on the incident diffraction element 1205, followed by reflection in the vertical-direction light guiding plate 1204. Then, the left-end light LL is output from the incident diffraction element 1205, while overlapping right-end light RL of the diffraction light HL. In this case, the diffraction light HL is totally output from the incident diffraction element 1205 without causing light loss. Further, light is incident on the dynamic output diffraction element 1206 without an interval. Accordingly, diffraction light VL as output light from the vertical-direction light guiding plate 1204 is output without an interval.

Thus, the incident width W of diffraction light HL to be incident on the incident diffraction element 1205 is equal to the incident width of diffraction light HL to be optimally extracted from the dynamic output diffraction element 1206, which corresponds to the diameter of a collimator lens. Specifically, the incident width W ($=2 \times T \times \tan \theta$) illustrated in FIG. 20 is the maximum incident width of diffraction light HL to be extracted from the dynamic output diffraction element 1206.

As described above, however, diffraction light HL from the horizontal-direction light guiding plate 1201 includes a spread in a vertical direction. Accordingly, the incident width of light to be incident on the incident diffraction element 1205 may vary depending on the horizontal position of diffraction light HL.

Figure 21:
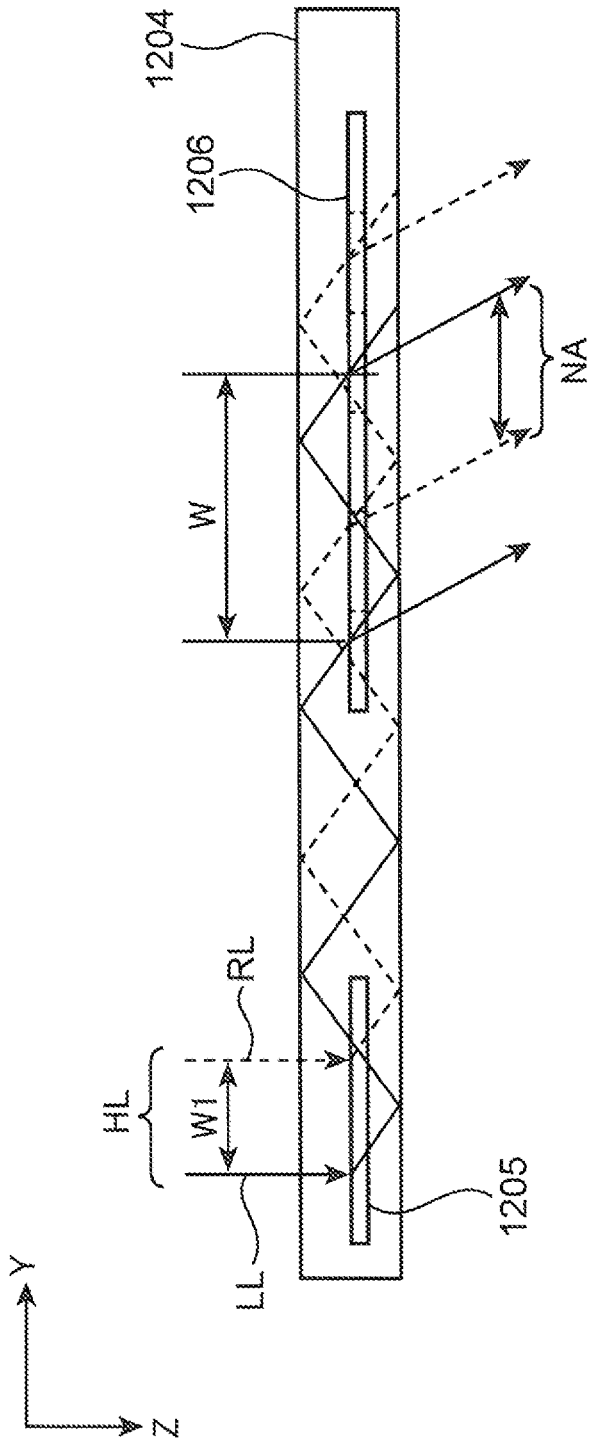
FIG. 21 is a schematic diagram for describing a problem involved when the incident width on the light guiding plate is small.

FIG. 21 illustrates an example, in which diffraction light HL is incident with an incident width W1 smaller than the maximum incident width W, when the diffraction angle $\theta$ of light on the incident diffraction element 1205 is determined by the relationship as expressed by the formula (2). In this example, left-end light LL and right-end light RL of the diffraction light propagate in the vertical-direction light guiding plate 1204 in a non-overlapped state. This results in formation of an area on the dynamic output diffraction element 1206 in which light is not incident, and results in formation of an area NA to which diffraction light from the light guiding plate 1204 is not output. When the area NA coincides with the eyeball position of the driver, the driver cannot visually recognize a display image.

Figure 22:
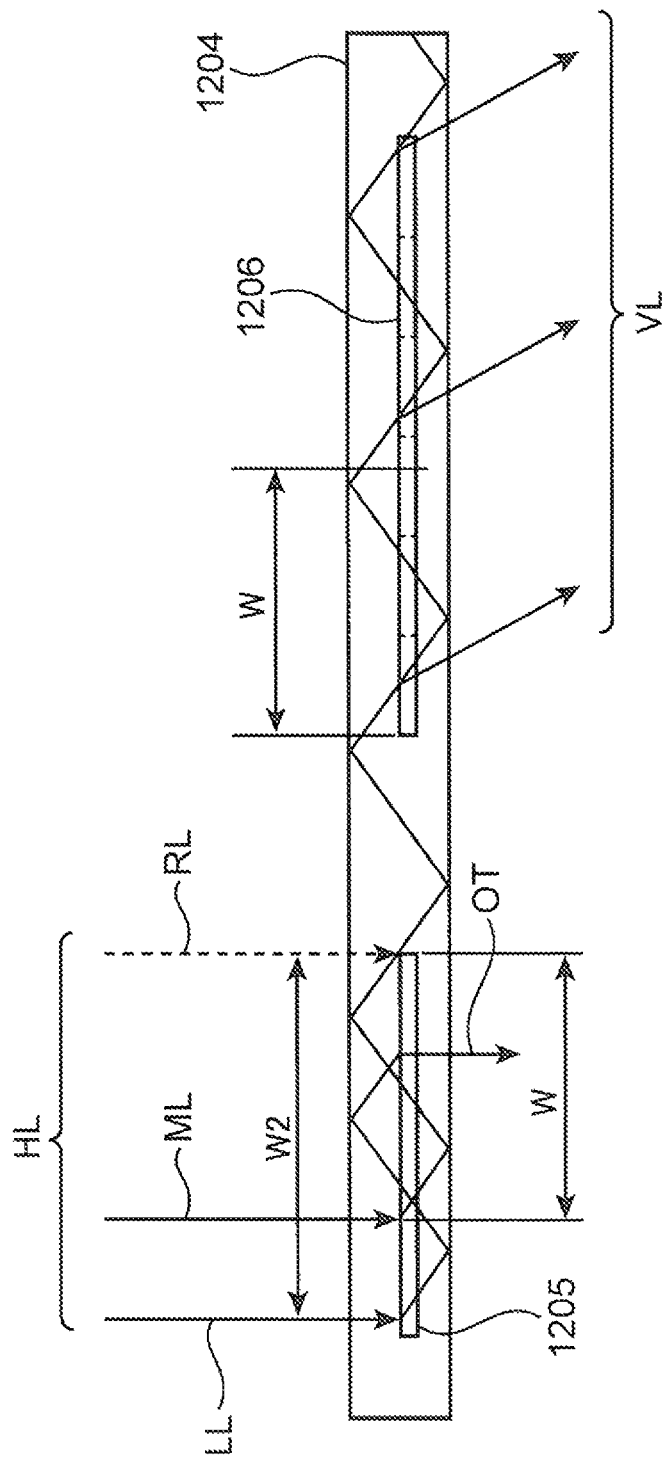
FIG. 22 is a schematic diagram for describing a problem involved when the incident width on the light guiding plate is large.

Further, FIG. 22 illustrates an example, in which diffraction light HL is incident with an incident width W2 larger than the maximum incident width W. In this example, the width of the incident diffraction element 1205 increases, as the incident width W2 increases. In this case, left-end light LL of the diffraction light HL is diffracted on the incident diffraction element 1205, and thereafter, is incident on the incident diffraction element 1205 in a state that the light satisfies the diffraction condition. Accordingly, the left-end light LL of the diffraction light HL is output to the outside of the light guiding plate 1204 as diffraction light OT, and does not reach the eye box of the driver.

Diffraction light to be incident on the dynamic output diffraction element 1206 is light in the region from the right-end right RL of the diffraction light HL to light ML in the range of the maximum incident width W. Light in the region from the left-end light LL to the light ML is output to the outside of the vertical-direction light guiding plate 1204 by the incident diffraction element 1205. This causes light loss. Thus, light loss increases toward the left-end light LL of the diffraction light HL. This causes a problem such that an image to be displayed to the driver includes luminance variation.

When the width of the incident diffraction element 1205 is smaller than the incident width W2, light loss occurs, because there is formed an area where a part of the diffraction light HL is not diffracted on the incident diffraction element 1205.

In the embodiment, as a method for solving the above problem, the incident diffraction element of the vertical-direction light guiding plate is divided into two areas, and a dynamic diffraction element is used. This example is described referring to FIG. 23 and FIG. 24.

The configuration of the embodiment except for the vertical-direction light guiding plate 1204a is substantially the same as the configuration of the fourth embodiment, and accordingly, illustration and description thereof are omitted. Further, a dynamic output diffraction element 1206 in the embodiment has substantially the same configuration as the dynamic output diffraction element in the fourth embodiment. As well as the fourth embodiment, the control circuit 7 (see FIG. 1) controls the dynamic output diffraction element 1206 in such a manner that one dynamic diffraction segment element whose diffraction function is validated is selected each at a time from among the dynamic diffraction segment elements constituting the dynamic output diffraction element 1206. The embodiment is not specifically limited to the above example, but another control method may be used.

Figure 23:
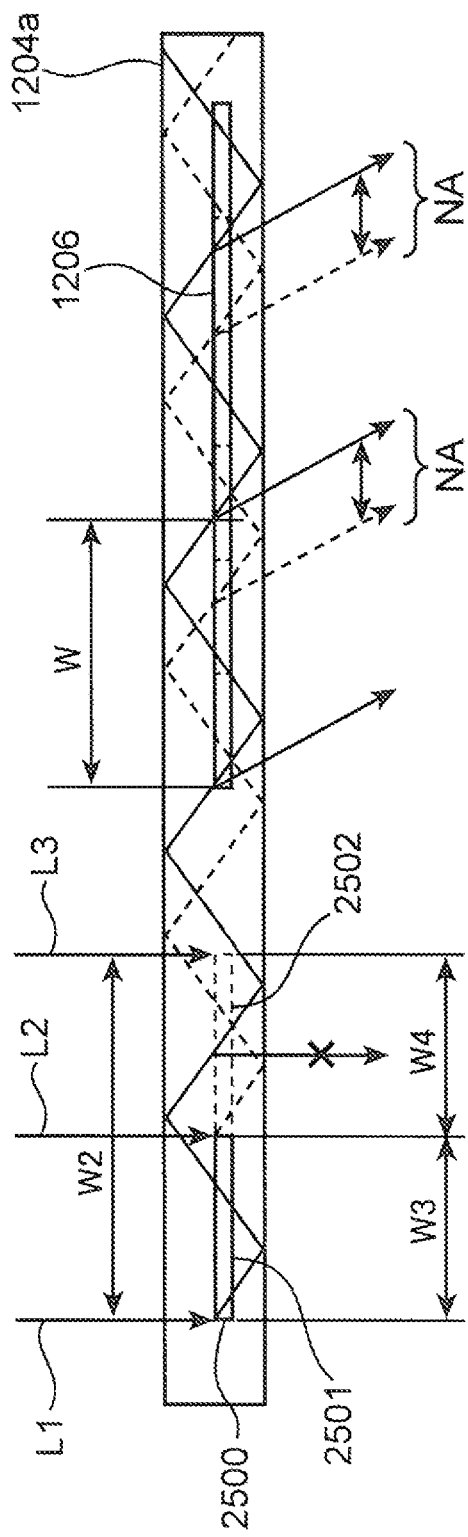
FIG. 23 is a diagram illustrating a configuration example of a vertical-direction light guiding plate to be used in a HUD according to the seventh embodiment of the invention.

In FIG. 23, a dynamic incident diffraction element 2500 is provided in the vertical-direction light guiding plate 1204a for guiding light of an incident width W2 corresponding to the region from diffraction light L1 to diffraction light L3 to the dynamic output diffraction element 1206. Further, the dynamic incident diffraction element 2500 is divided into a lower dynamic diffraction element 2501 in a lower area and an upper dynamic diffraction element 2502 in an upper area. Further, the lower dynamic diffraction element 2501 and the upper dynamic diffraction element 2502 are dynamic diffraction elements whose diffraction function of diffracting light is invalidated or validated by voltage application, and are configured to diffract incident light at a diffraction angle θ.

In the state illustrated in FIG. 23, the diffraction function of the lower dynamic diffraction element 2501 is validated, and the diffraction function of the upper dynamic diffraction element 2502 is invalidated by the control circuit 7 (see FIG. 1). In this state, only the light in the lower area (light of an incident width W3 corresponding to the region from the diffraction light L1 to diffraction light L2) out of the diffraction light to be incident on the vertical-direction light guiding plate 1204a is diffracted.

The incident width W3 corresponding to the region from the diffraction light L1 to the diffraction light L2 is configured to be smaller than the maximum incident width W. The length W3 of the lower dynamic diffraction element 2501 is shorter than the maximum incident width W of diffraction light HL to be extracted from the dynamic output diffraction element 1206. Accordingly, there is no likelihood that light in the region from the diffraction light L1 to the diffraction light L2 may be output to the outside of the vertical-direction light guiding plate 1204a by the dynamic incident diffraction element 2500. However, since light is not incident on the entire surface of the dynamic output diffraction element 1206, there is formed an area NA where light from the vertical-direction light guiding plate 1204a does not reach.

Figure 24:
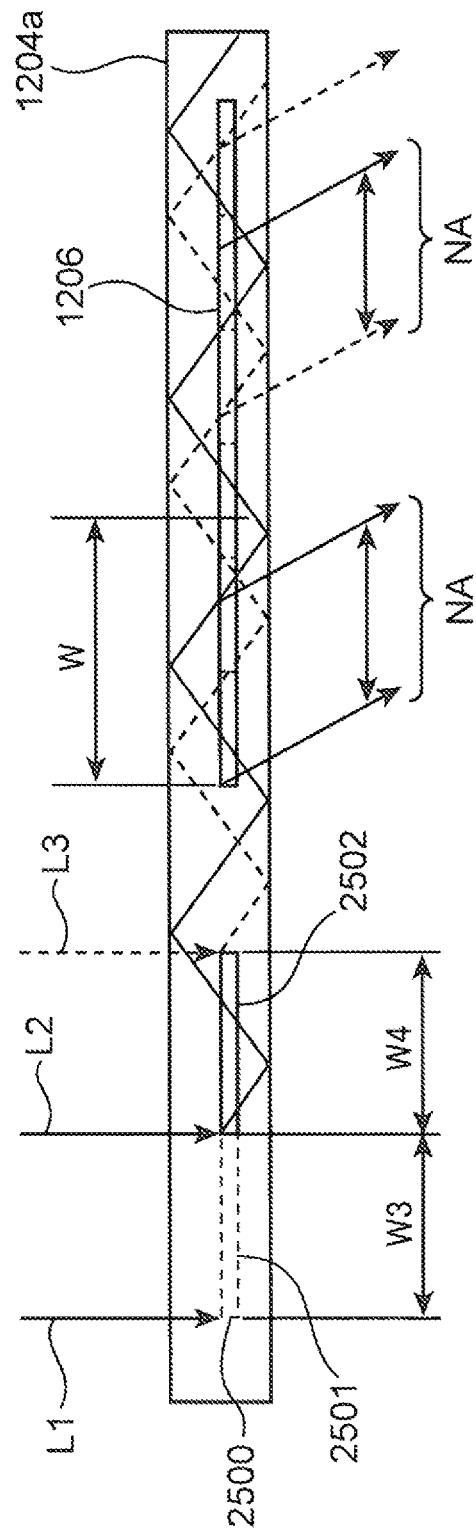
FIG. 24 is a diagram illustrating a state of a diffraction function of the vertical-direction light guiding plate illustrated in FIG. 23.
Figure 25:
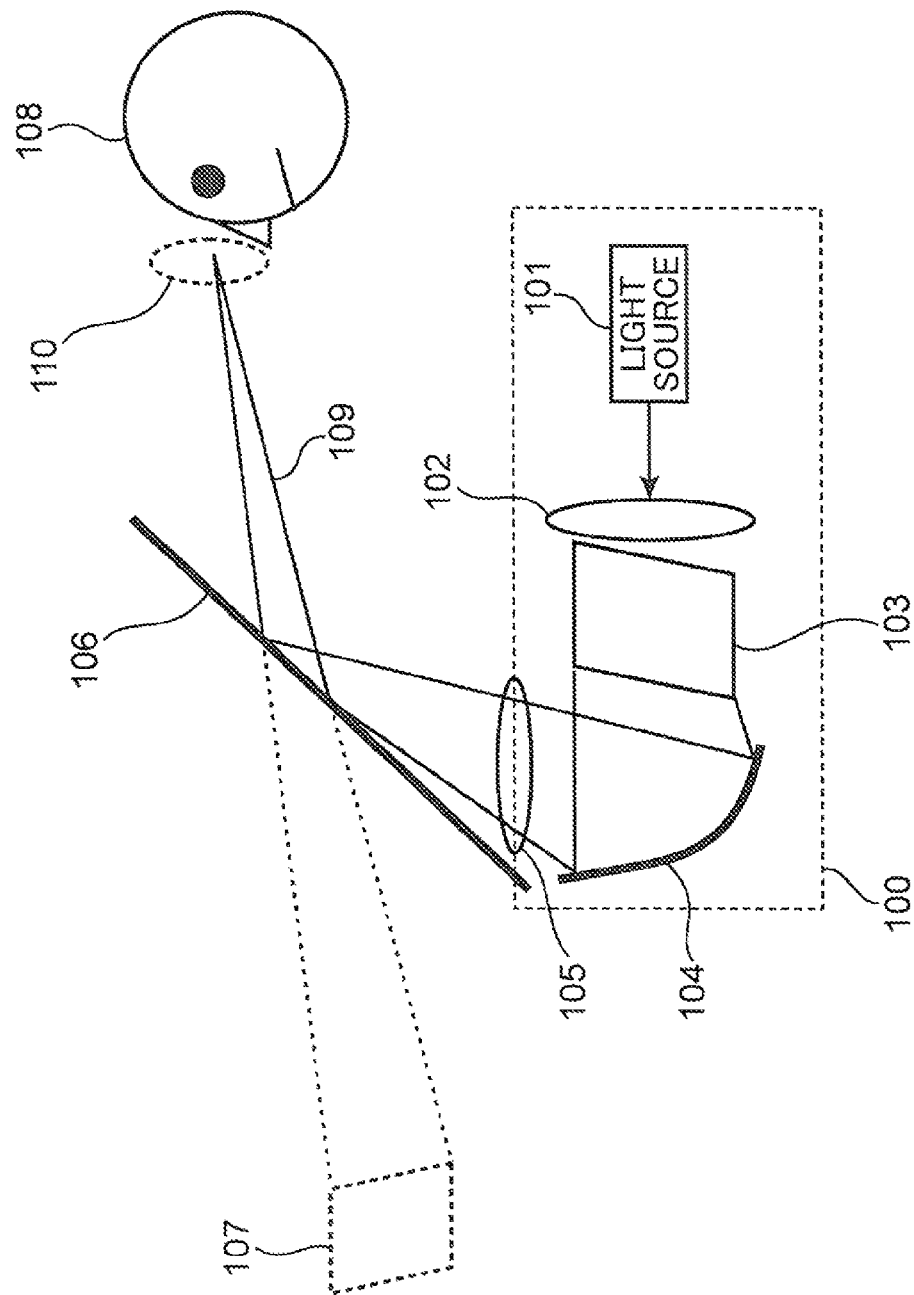
FIG. 25 is a diagram illustrating a configuration example of a conventional HUD using reflection on a front glass.

In the state illustrated in FIG. 24, the diffraction function of the upper dynamic diffraction element 2502 is validated, and the diffraction function of the lower dynamic diffraction element 2501 is invalidated by the control circuit 7 (see FIG. 1). In this state, only the light in the upper area (light of an incident width W4 corresponding to the region from diffraction light L2 to diffraction light L3) out of the diffraction light to be incident on the vertical-direction light guiding plate 1204a is diffracted.

The incident width W4 corresponding to the region from the diffraction light L2 to the diffraction light L3 is configured to be smaller than the maximum incident width W. The length W4 of the upper dynamic diffraction element 2502 is shorter than the maximum incident width W of diffraction light HL to be extracted from the dynamic output diffraction element 1206. Accordingly, there is no likelihood that light in the region from the diffraction light L2 to the diffraction light L3 may be output to the outside of the vertical-direction light guiding plate 1204a by the dynamic incident diffraction element 2500. However, since light is not incident on the entire surface of the dynamic output diffraction element 1206, there is formed an area NA where light from the vertical-direction light guiding plate 1204a does not reach.

In the embodiment, the length of the lower dynamic diffraction element 2501 and of the upper dynamic diffraction element 2502 is configured such that the sum of the incident width W3 and the incident width W4 exceeds the maximum incident width W. The sum of the length W3 of the tower dynamic diffraction element 2501, and the length W4 of the upper dynamic diffraction element 2502 (the total length of the dynamic incident diffraction element 2500) is longer than the maximum incident width W of diffraction tight HL to be extracted from the dynamic output diffraction element 1206. Accordingly, causing the control circuit 7 to alternately validate the diffraction function of the lower dynamic diffraction element 2501 and of the upper dynamic diffraction element 2502 i.e. switching the state between the state illustrated in FIG. 23 and the state illustrated in FIG. 24 makes it possible to eliminate the area NA to which light is not output, which may be formed when the two states are overlapped with each other.

As described above, in the embodiment, there is no likelihood that light may be output to the outside of the vertical-direction light guiding plate 120a by the dynamic incident diffraction element 2500. This is advantageous in preventing luminance variation of a display image. Further, in the embodiment, the maximum incident width W is configured to be a smallest vertical direction width of diffraction light (the width Wmin illustrated in FIG. 19). This makes it possible to suppress diffraction of unwanted light by the dynamic incident diffraction element 2500 of the vertical-direction light guiding plate 1204a to thereby suppress luminance variation.

The foregoing embodiments are merely examples. Various modifications may be applied as far as such modifications do not depart from the gist of the invention. For instance, the first embodiment, the second embodiment, and the third embodiment may be combined to carry out the invention.

Further, the foregoing embodiments exemplify a HUD to be used in a car. The invention may be modified as follows. For instance, the invention may be implemented as a HMD configured such that a light guiding plate portion is loaded in eyeglasses. Further, the invention may be implemented as a card-type transmissive display device.

The following is the description about the aspects of the invention in view of the foregoing embodiments. Specifically, an image display device according to an aspect of the invention is provided with a light source which emits light; a display element which receives the light from the light source for generating display light; a light guiding plate which causes the display light to propagate therein; an incident element which allows the display light from the display element to be incident into the light guiding plate; and a dynamic output diffraction element provided in the tight guide plate for outputting the display light to an outside of the light guiding plate. The dynamic output diffraction element includes a plurality of dynamic diffraction segment elements configured such that a diffraction function of diffracting light is invalidated or validated by voltage application. The image display device is further provided with a control unit which controls the dynamic output diffraction element in such a manner that one dynamic diffraction segment element whose diffraction function is validated is selected each at a time from among the dynamic diffraction segment elements.

According to the above image display device, the dynamic output diffraction element is controlled in such a manner that one dynamic diffraction segment element whose diffraction function is validated is selected each at a time from among the dynamic diffraction segment elements. Accordingly, it is possible to prevent external light diffracted on the dynamic diffraction segment element whose diffraction function is validated from being diffracted on another dynamic diffraction element. Thus, it is possible to suppress generation of stray light. As a result, it is possible to prevent stray light resulting from external light to thereby enhance the visibility of the user, and to miniaturize the optical system.

Preferably, a length L of the dynamic diffraction segment element may be a value smaller than $2 \times T \times \tan \theta$, assuming that T is a thickness of the light guiding plate, and $\theta$ is a reflection angle of the display light within the light guiding plate.

In the above configuration, it is possible to prevent external light diffracted on the dynamic diffraction segment element whose diffraction function is validated from being diffracted on the dynamic diffraction element. Thus, it is possible to suppress generation of stray light.

Preferably, the image display device may be further provided with a pupil detection unit which detects an eyeball position of a user, wherein the control unit is configured to select a dynamic diffraction segment element whose diffraction function is validated from among the dynamic diffraction segment elements in response to a detection result of the pupil detection unit.

In the above configuration, it is possible to collect the display light on the eyeball of the user. This is advantageous in displaying an image with a high luminance.

Preferably, the image display device may be further provided with an input unit through which position information of an eyeball of a user is input, wherein the control unit is configured to select a dynamic diffraction segment element whose diffraction function is validated from among the dynamic diffraction segment elements in response to the position information input through the input unit.

In the above configuration, it is possible to collect the display light at a position suitable for the eyeball position of the user. This is advantageous in displaying an image with a high luminance.

Preferably, the image display device may be farther provided with a polarizing plate disposed on a side of the dynamic output diffraction element on which external light is incident, and configured to transmit only polarized light in a specific direction, wherein the dynamic output diffraction element is inoperative to diffract the polarized light in the specific direction.

In the above configuration, the dynamic output diffraction element is inoperative to polarize the light that has passed through the polarizing plate. This is advantageous in preventing stray light resulting from external light.

Preferably, the display element may include a display element using a computer generated hologram.

In the above configuration, it is possible to omit a projection lens system. This is advantageous in miniaturizing the image display device.

Preferably, the dynamic output diffraction element may include a dynamic output diffraction element for a red wavelength region configured to diffract first polarized light; a dynamic output diffraction element for a green wavelength region configured to diffract second polarized light different from the first polarized light; and a dynamic output diffraction element for a blue wavelength region configured to diffract the first polarized light.

In the above configuration, it is possible to suppress generation of crosstalk resulting from the dynamic output diffraction element for the red wavelength region and the dynamic output diffraction element for the green wavelength region close to each other in the wavelength region, and to suppress generation of crosstalk resulting from the dynamic output diffraction element for the green wavelength region and the dynamic output diffraction element for the blue wavelength region close to each other in the wavelength region.

Preferably, the light guiding plate may include a first light guiding plate which divides the display light into first display light and second display light, and causes the first display light to propagate therein; a second light guiding plate which receives the second display light to be output from the first light guiding plate, and causes the second display light to propagate therein; and a third light guiding plate disposed on the same side as the first light guiding plate with respect to the second light guiding plate, and configured to receive the second display light to be output from the second light guiding plate and to cause the second display light to propagate therein. The dynamic output diffraction element may include a first dynamic output diffraction element provided in the first light guiding plate for outputting the first display light to an outside of the first light guiding plate; and a second dynamic output diffraction element provided in the third light guiding plate for outputting the second display light to an outside of the third light guiding plate. The first dynamic output diffraction element may include a plurality of first dynamic diffraction segment elements configured such that a diffraction function of diffracting light is invalidated or validated by voltage application. The second dynamic output diffraction element may include a plurality of second dynamic diffraction segment elements configured such that a diffraction function of diffracting light is invalidated or validated by voltage application. The control unit may control the first dynamic output diffraction element in such a manner that one first dynamic diffraction segment element whose diffraction function is validated is selected each at a time from among the first dynamic diffraction segment elements, and may control the second dynamic output diffraction element in such a manner that one second dynamic diffraction segment element whose diffraction function is validated is selected each at a time from among the second dynamic diffraction segment elements.

In the above configuration, even in use of a dynamic diffraction element having an ITO film as the first and second output diffraction elements, the number of times of causing the light to pass through the first dynamic output diffraction element and the number of times of causing the light to pass through the second dynamic diffraction element are made to be uniform, because the dynamic diffraction element is divided into the first and second dynamic output diffraction elements. This allows for light scattering by the ITO film to be minimum and uniform.

Preferably, the light guiding plate may include a first light guiding plate which receives the display light, causes the display light to propagate therein for outputting first enlarged display light in which the display light is enlarged in a first direction; and a second light guiding plate which receives the first enlarged display light to be output from the first light guiding plate, causes the first enlarged display light to propagate therein for outputting second enlarged display light in which the first enlarged display light is enlarged in a second direction intersecting with the first direction. The dynamic output diffraction element may be provided in the second light guiding plate for outputting the second enlarged display light to an outside of the second light guiding plate.

In the above configuration, the area of light to be output from the second light guiding plate is largely enlarged in the first direction and in the second direction by the first and second light guiding plates. This provides the user with a wide eye box.

Preferably, a length of the dynamic output diffraction element in the second direction may be configured to increase toward the display element.

In the above configuration, even in use of a diffraction element having an ITO film in the first and second light guiding plates, it is possible to make the numbers of times of causing the light to pass through the first and second light guiding plates to be uniform. This is advantageous in suppressing a variation in the image quality of a virtual image.

Preferably, the image display device may be further provided with a dynamic incident diffraction element provided in the second light guiding plate for guiding the first enlarged display light to the dynamic output diffraction element wherein the dynamic incident diffraction element includes a plurality of dynamic incident diffraction segment elements configured such that a diffraction function of diffracting light is invalidated or validated by voltage application, the control unit controls the dynamic incident diffraction element in such a manner that one dynamic incident diffraction segment element whose diffraction function is validated is selected each at a time from among the dynamic incident diffraction segment elements, and a length of each of the dynamic incident diffraction segment elements is configured to be shorter than a maximum incident width of the first enlarged display light to be extracted from the dynamic output diffraction element, and a total length of the dynamic incident diffraction element is configured to be longer than the maximum incident width.

In the above configuration, there is no likelihood that tight may be output to the outside of the second light guiding plate by the dynamic incident diffraction element. This is advantageous in preventing luminance variation of a display image.

An image display device according to another aspect of the invention is provided with a light source which emits light; a display element which receives the light from the light source for generating display light; a light guiding plate which causes the display light to propagate therein; an incident element which allows the display light from the display element to be incident into the light guiding plate; and a dynamic output diffraction element provided in the light guide plate for outputting the display light to an outside of the light guiding plate. The dynamic output diffraction element includes a plurality of dynamic diffraction segment elements configured such that a diffraction function of diffracting light is invalidated or validated by voltage application. The image display device is further provided with a polarizing plate disposed on a side of the dynamic output diffraction element on which external light is incident, and configured to transmit only polarized light in a specific direction, wherein the dynamic output diffraction element is inoperative to diffract the polarized light in the specific direction.

According to the above image display device, the dynamic output diffraction element is inoperative to polarize the light that has passed through the polarizing plate. This is advantageous in preventing stray light resulting from external light.

An image display device according to yet another aspect of the invention is provided with a light source which emits light; a display element which receives the light from the light source for generating display light; a light guiding plate which causes the display light to propagate therein; an incident element which allows the display light from the display element to be incident into the light guiding plate; and a dynamic output diffraction element provided in the light guide plate for outputting the display light to an outside of the light guiding plate. The dynamic output diffraction element includes a plurality of dynamic diffraction segment elements configured such that a diffraction function of diffracting light is invalidated or validated by voltage application. The display element includes a display element using a computer generated hologram.

According to the above image display device, it is possible to omit a projection lens system. This is advantageous in miniaturizing the image display device.

An image display device according to yet another aspect of the invention is provided with a light source which emits light; a display element which receives the light from the light source for generating display light; a light guiding plate which causes the display light to propagate therein; an incident element which allows the display light from the display element to be incident into the light guiding plate; and a dynamic output diffraction element provided in the light guide plate for outputting the display light to an outside of the light guiding plate. The dynamic output diffraction element includes a plurality of dynamic diffraction segment elements configured such that a diffraction function of diffracting light is invalidated or validated by voltage application. The dynamic output diffraction element includes a dynamic output diffraction element for a red wavelength region configured to diffract first polarized light; a dynamic output diffraction element for a green wavelength region configured to diffract second polarized light different from the first polarized light; and a dynamic output diffraction element for a blue wavelength region configured to diffract the first polarized light.

According to the above image display device, it is possible to suppress generation of crosstalk resulting from the dynamic output diffraction element for the red wavelength region and the dynamic output diffraction element for the green wavelength region close to each other in the wavelength region, and to suppress generation of crosstalk resulting from the dynamic output diffraction element for the green wavelength region and the dynamic output diffraction element for the blue wavelength region close to each other in the wavelength region.

An image display device according to yet another aspect of the invention is provided with a light source which emits light; a display element which receives the light from the light source for generating display light; a light guiding plate which causes the display light to propagate therein; an incident element which allows the display light from the display element to be incident into the light guiding plate; and a dynamic output diffraction element provided in the light guide plate for outputting the display light to an outside of the light guiding plate. The dynamic output diffraction element includes a plurality of dynamic diffraction segment elements configured such that a diffraction function of diffracting light is invalidated or validated by voltage application. The light guiding plate includes a first light guiding plate which divides the display light into first display light and second display light, and causes the first display light to propagate therein; a second light guiding plate which receives the second display light to be output from the first light guiding plate, and causes the second display light to propagate therein; and a third light guiding plate disposed on the same side as the first light guiding plate with respect to the second light guiding plate, and configured to receive the second display light to be output from the second light guiding plate and to cause the second display light to propagate therein. The dynamic output diffraction element includes a first dynamic output diffraction element provided in the first light guiding plate for outputting the first display light to an outside of the first light guiding plate; and a second dynamic output diffraction element provided in the third light guiding plate for outputting the second display light to an outside of the third light guiding plate. The first dynamic output diffraction element includes a plurality of first dynamic diffraction segment elements configured such that a diffraction function of diffracting light is invalidated or validated by voltage application. The second dynamic output diffraction element includes a plurality of second dynamic diffraction segment elements configured such that a diffraction function of diffracting light is invalidated or validated by voltage application.

According to the above image display device, even in use of a dynamic diffraction element having an ITO film as the first and second output diffraction elements, the number of times of causing the light to pass through the first dynamic output diffraction element and the number of times of causing the light to pass through the second dynamic diffraction element are made to be uniform, because the dynamic diffraction element is divided into the first and second dynamic output diffraction elements. This allows for light scattering by the ITO film to be minimum and uniform.

An image display device according to still another aspect of the invention is provided with a light source which emits light; a display element which receives the light from the light source for generating display light; a light guiding plate which causes the display light to propagate therein; an incident element which allows the display light from the display element to be incident into the light guiding plate; and a dynamic output diffraction element provided in the light guide plate for outputting the display light to an outside of the light guiding plate. The dynamic output diffraction element includes a plurality of dynamic diffraction segment elements configured such that a diffraction function of diffracting light is invalidated or validated by voltage application. The light guiding plate includes a first light guiding plate which receives the display light, causes the display light to propagate therein for outputting first enlarged display light in which the display light is enlarged in a first direction; and a second light guiding plate which receives the first enlarged display light to be output from the first light guiding plate, causes the first enlarged display light to propagate therein fin outputting second enlarged display light in which the first enlarged display light is enlarged in a second direction intersecting with the first direction. The dynamic output diffraction element is provided in the second light guiding plate for outputting the second enlarged display light to an outside of the second light guiding plate.

According to the above image display device, the area of light to be output from the second light guiding plate is largely enlarged in the first direction and in the second direction by the first and second light guiding plates. This provides the user with a wide eye box.

INDUSTRIAL APPLICABILITY

The image display device of the invention realizes a compact optical system by combining a light guiding plate and a diffraction element, and is useful as an image display device such as a HUD or a HMD. Further, the invention is also applicable to a display system, a display method, a display device designing method, and the like.

The invention claimed is:
1. An image display device, comprising:
a light source which emits light;
a display element which receives the light from the light source for generating display light;
a light guiding plate which causes the display light to propagate therein;
an incident element which allows the display light from the display element to be incident into the light guiding plate; and
a dynamic output diffraction element provided in the light guiding plate for outputting the display light to an outside of the light guiding plate, wherein
the dynamic output diffraction element includes a plurality of dynamic diffraction segment elements configured such that a diffraction function of diffracting light is invalidated or validated by voltage application, and
the image display device further comprises a control unit which controls the dynamic output diffraction element in such a manner that one dynamic diffraction segment element whose diffraction function is validated is selected each at a time from among the dynamic diffraction segment elements, and
when the diffraction function of the one dynamic diffraction segment element is validated, the diffraction function of the rest of the dynamic diffraction segments is invalidated.
2. The image display device according to claim 1, wherein a length L of the dynamic diffraction segment element is a value smaller than $2 \times T \times \tan \theta$, assuming that T is a thickness of the light guiding plate, and $\theta$ is a reflection angle of the display light within the light guiding plate.
3. The image display device according to claim 1, further comprising:
a pupil detection unit which detects an eyeball position of a user, wherein
the control unit is configured to select a dynamic diffraction segment element whose diffraction function is validated from among the dynamic diffraction segment elements in response to a detection result of the pupil detection unit.

4. The image display device according to claim 1, further comprising:
an input unit through which position information of an eyeball of a user is input, wherein
the control unit is configured to select a dynamic diffraction segment element whose diffraction function is validated from among the dynamic diffraction segment elements in response to the position information input through the input unit.

5. The image display device according to claim 1, further comprising:
a polarizing plate disposed on a side of the dynamic output diffraction element on which external light is incident, and configured to transmit only polarized light in a specific direction, wherein
the dynamic output diffraction element is inoperative to diffract the polarized light in the specific direction.

6. The image display device according to claim 1, wherein the display element includes a display element using a computer generated hologram.

7. The image display device according to claim 1, wherein the dynamic output diffraction element includes:
a dynamic output diffraction element for a red wavelength region configured to diffract first polarized light;
a dynamic output diffraction element for a green wavelength region configured to diffract second polarized light different from the first polarized light; and
a dynamic output diffraction element for a blue wavelength region configured to diffract the first polarized light.

8. The image display device according to claim 1, wherein the light guiding plate includes:
a first light guiding plate which divides the display light into first display light and second display light, and causes the first display light to propagate therein;
a second light guiding plate which receives the second display light to be output from the first light guiding plate, and causes the second display light to propagate therein; and
a third light guiding plate disposed on the same side as the first light guiding plate with respect to the second light guiding plate, and configured to receive the second display light to be output from the second light guiding plate and to cause the second display light to propagate therein,
the dynamic output diffraction element includes:
a first dynamic output diffraction element provided in the first light guiding plate for outputting the first display light to an outside of the first light guiding plate; and
a second dynamic output diffraction element provided in the third light guiding plate for outputting the second display light to an outside of the third light guiding plate,
the first dynamic output diffraction element includes a plurality of first dynamic diffraction segment elements configured such that a diffraction function of diffracting light is invalidated or validated by voltage application,
the second dynamic output diffraction element includes a plurality of second dynamic diffraction segment elements configured such that a diffraction function of diffracting light is invalidated or validated by voltage application, and
the control unit controls the first dynamic output diffraction element in such a manner that one first dynamic diffraction segment element whose diffraction function is validated is selected each at a time from among the first dynamic diffraction segment elements, and controls the second dynamic output diffraction element in such a manner that one second dynamic diffraction segment element whose diffraction function is validated is selected each at a time from among the second dynamic diffraction segment elements.

9. The image display device according to claim 1, wherein the light guiding plate includes:
a first light guiding plate which receives the display light, causes the display light to propagate therein for outputting first enlarged display light in which the display light is enlarged in a first direction; and
a second light guiding plate which receives the first enlarged display light to be output from the first light guiding plate, causes the first enlarged display light to propagate therein for outputting second enlarged display light in which the first enlarged display light is enlarged in a second direction intersecting with the first direction, and
the dynamic output diffraction element is provided in the second light guiding plate for outputting the second enlarged display light to an outside of the second light guiding plate.

10. The image display device according to claim 9, wherein a length of the dynamic output diffraction element in the second direction is configured to increase toward the display element.

11. The image display device according to claim 9, further comprising:
a dynamic incident diffraction element provided in the second light guiding plate for guiding the first enlarged display light to the dynamic output diffraction element, wherein
the dynamic incident diffraction element includes a plurality of dynamic incident diffraction segment elements configured such that a diffraction function of diffracting light is invalidated or validated by voltage application,
the control unit controls the dynamic incident diffraction element in such a manner that one dynamic incident diffraction segment element whose diffraction function is validated is selected each at a time from among the dynamic incident diffraction segment elements, and
a length of each of the dynamic incident diffraction segment elements is configured to be shorter than a maximum incident width of the first enlarged display light to be extracted from the dynamic output diffraction element, and a total length of the dynamic incident diffraction element is configured to be longer than the maximum incident width.

* * * * *